United States Patent
Li et al.

(10) Patent No.: US 11,628,530 B2
(45) Date of Patent: Apr. 18, 2023

(54) POSITIONING SYSTEM WITH ADJUSTABLE CLAMPING FORCE AND MILLING EQUIPMENT FOR RAIL TRANSIT HONEYCOMB WORKPIECE

(71) Applicants: QINGDAO UNIVERSITY OF TECHNOLOGY, Shandong (CN); QINGDAO KAWS INTELLIGENT MANUFACTURING CO. LTD., Shandong (CN)

(72) Inventors: Changhe Li, Qingdao (CN); Zhuang Shi, Qingdao (CN); Aiguo Qin, Qingdao (CN); Bo Liu, Qingdao (CN); Yun Chen, Qingdao (CN); Huajun Cao, Qingdao (CN); Zongming Zhou, Qingdao (CN); Naiqing Zhang, Qingdao (CN); Qidong Wu, Qingdao (CN); Bingheng Lu, Qingdao (CN); Teng Gao, Qingdao (CN); Yanbin Zhang, Qingdao (CN); Min Yang, Qingdao (CN); Mingzheng Liu, Qingdao (CN); Xiaoming Wang, Qingdao (CN)

(73) Assignees: QINGDAO UNIVERSITY OF TECHNOLOGY, Qingdao (CN); QINGDAO KAWS INTELLIGENT MANUFACTURING CO. LTD., Qingdao (CN)

( * ) Notice: Subject to any disclaimer, the term of this patent is extended or adjusted under 35 U.S.C. 154(b) by 0 days.

(21) Appl. No.: 17/549,439

(22) Filed: Dec. 13, 2021

(65) Prior Publication Data
US 2022/0379418 A1     Dec. 1, 2022

(30) Foreign Application Priority Data
May 20, 2021 (CN) .......................... 202110555381.X

(51) Int. Cl.
*B23Q 11/10* (2006.01)
*B23Q 3/06* (2006.01)
(Continued)

(52) U.S. Cl.
CPC .................. *B23Q 3/18* (2013.01); *B23C 3/00* (2013.01); *B23C 9/00* (2013.01); *B23Q 3/069* (2013.01);
(Continued)

(58) Field of Classification Search
CPC ........ B23Q 3/069; B23Q 3/062; B23Q 3/065; B25B 5/04; B25B 1/04; B25B 1/22; B25B 5/062; B25B 5/064; B23C 2228/25
(Continued)

(56) References Cited

U.S. PATENT DOCUMENTS

| 5,437,440 A | * | 8/1995 | Keaton | .................... B25B 5/062 269/24 |
| 5,820,118 A | * | 10/1998 | Craft | ....................... B25B 5/062 269/30 |

(Continued)

FOREIGN PATENT DOCUMENTS

| CN | 105500068 A | * | 4/2016 |
| CN | 108115462 A | * | 6/2018 |

(Continued)

*Primary Examiner* — Erica E Cadugan
(74) *Attorney, Agent, or Firm* — Oliff PLC

(57) ABSTRACT

The present invention discloses a positioning system with an adjustable clamping force and a milling equipment for a rail transit honeycomb workpiece. The positioning system includes: a positioning apparatus, including a positioning table to support a workpiece; and a clamping apparatus, including a turntable, where the turntable is fixedly disposed on a periphery of the positioning table, a top of the turntable is connected to a mechanical arm, a pressure plate is disposed at an end of the mechanical arm, and the pressure
(Continued)

plate is capable of cooperating with the positioning table to clamp the workpiece, where there are a plurality of clamping apparatuses, working regions of adjacent clamping apparatuses have an intersection, and working regions of all the clamping apparatuses are capable of covering a machining surface of the workpiece; and when machining is performed in an intersection region, a clamping apparatus corresponding to the region clamps the workpiece, and when machining is performed in a non-intersection region, a clamping apparatus corresponding to the region dodges, and an adjacent clamping apparatus clamps the workpiece.

16 Claims, 19 Drawing Sheets

(51) Int. Cl.
| | | |
|---|---|---|
| *B23C 3/00* | (2006.01) | |
| *B25B 5/04* | (2006.01) | |
| *B23Q 3/18* | (2006.01) | |
| *B23C 9/00* | (2006.01) | |

(52) U.S. Cl.
CPC .......... *B23Q 11/10* (2013.01); *B23Q 11/1046* (2013.01); *B23Q 11/1076* (2013.01); *B23C 2228/25* (2013.01); *Y10T 409/304032* (2015.01); *Y10T 409/309016* (2015.01)

(58) Field of Classification Search
USPC ........................ 269/71, 57, 56, 104, 73, 228
See application file for complete search history.

(56) References Cited

U.S. PATENT DOCUMENTS

| | | | |
|---|---|---|---|
| 7,111,834 B2* | 9/2006 | Steele | B25B 5/062 |
| | | | 269/27 |
| 2008/0098954 A1* | 5/2008 | Banks | B05B 15/652 |
| | | | 118/300 |
| 2020/0086441 A1* | 3/2020 | Li | B05B 15/65 |

FOREIGN PATENT DOCUMENTS

| | | | |
|---|---|---|---|
| CN | 215744320 U | * | 2/2022 |
| JP | 2004-167665 A | * | 6/2004 |
| WO | WO-2017/031796 A1 | * | 3/2017 |

* cited by examiner

POSITIONING SYSTEM WITH ADJUSTABLE CLAMPING FORCE AND MILLING EQUIPMENT FOR RAIL TRANSIT HONEYCOMB WORKPIECE

TECHNICAL FIELD

The present invention relates to the field of machining device technologies, and specifically, to a positioning system with an adjustable clamping force and a milling equipment for a rail transit honeycomb workpiece.

BACKGROUND

Descriptions herein only provide the background related to the present invention, and do not necessarily constitute the prior art.

Aluminum honeycomb technologies are first applied to aspects of the aerospace industry. With the continuous deepening of reform and opening up, due to the weight-reducing and speed-raising requirements for a railway carriage, aluminum honeycomb products with excellent light-weight and high-strength properties have been widely applied. An aluminum honeycomb plate includes upper and lower aluminum plates and a middle aluminum honeycomb core, and essentially has a similar load transfer manner to an I-beam. The upper and lower plates are equivalent to flanges of the I-beam and mainly bear an in-plane tension-compression stress and a shear stress, and the aluminum honeycomb core is equivalent to a web of the I-beam and mainly bears a transverse shear stress. An equipment compartment is generally disposed at a lower portion of a rail transit vehicle, and is used for mounting most of equipment in the vehicle, but the vehicle generates a strong air pressure wave during high-speed running, so that rocks or other hard objects at a bottom of the vehicle and near a rail are sucked up, and the objects hit under-vehicle equipment mounted at the lower portion of the vehicle, and have great damage for the rail vehicle in high-speed movement. To protect the under-vehicle equipment and ensure the secure travel of the vehicle, an equipment compartment bottom plate is generally mounted at a lower portion of the equipment compartment. A honeycomb core structure of the aluminum honeycomb plate has a better energy absorption effect, and is often used as the equipment compartment bottom plate of the rail vehicle. Therefore, such an aluminum honeycomb plate is generally of a large flat cuboid, and is generally milled at a high speed during machining by using a large dynamic beam-type machine tool.

Currently, for an aspect of clamping and positioning before the honeycomb core is milled, there are generally the following several methods. Double-sided bonding method: In this method, a honeycomb structure is bonded to a machining platform to be fixed by using a double-sided tape, and defects are as follows: 1. A bonding force is small and uncontrollable, and is in line contact with a honeycomb surface, resulting in a poor holding effect. 2. Manual bonding is required, and the double-sided adhesive bonded to the honeycomb structure shall be cleaned with organic solvent after processing. 3. After the bonding, a position of a workpiece cannot be adjusted, otherwise wrinkles may appear. 4. It is not environmentally friendly. Vacuum adsorption method: This method is also referred to as a diaphragm method. A principle is to adhere, by using a binder, the honeycomb structure to a diaphragm made of plastic film or glass fiber reinforced plastic, and then fix the diaphragm to a machining platform by using the vacuum adsorption method, and defects are similar to those of the double-sided bonding method. Polyethylene glycol method: A basic principle of this method includes: first, heating polyethylene glycol to 70~90° C. for melting, and filling the whole honeycomb structure with fluid polyethylene glycol for cooling and solidification; and then normally clamping a honeycomb filled with solid polyethylene glycol to be fixed to the machining platform for mechanical machining. Defects are as follows: 1. This method is not suitable for large aluminum honeycomb core materials at all. 2. This method is not suitable for mass production. 3. A cycle is long. 4. Cutting heat during machining may melt the polyethylene glycol during machining. Magnetic powder friction holding method: Iron powder is evenly poured into honeycomb holes by using an automatic filling apparatus (where a filling depth is determined by machining components); and then, a magnetic platform is powered on to excite a magnetic field, so that the iron powder poured into the honeycomb holes generates a squeezing force on the honeycomb structure under the action of the magnetic field, and friction is further generated on a honeycomb hole wall, to implement holding of the honeycomb structure to be machined. The iron powder is in contact with a honeycomb hole wall surface, which has a sufficient holding force and achieves firm holding; and holding and unloading processes are convenient, and automatic control can be completely implemented, which facilitates industrial production. However, defects are as follows: 1. The iron powder is not easily cleaned. 2. Required equipment is complex. The holding completed by using this method requires a controllable magnetic machining platform, automatic filling equipment, iron powder recycling and reuse equipment, a digital control platform, and a power supply system fitting with each piece of equipment, resulting in high costs.

For an aspect of clamping and positioning before the honeycomb plate is milled, there are generally the following several methods. Bonding method: A honeycomb bottom plate is bonded to be positioned and held. Defects in this manner are similar to those of bonding the honeycomb core, and are as follows: being not environmentally friendly, increasing a labor amount, prolonging a production cycle, and being time-consuming and laborious. Because the honeycomb core is of a thin wall porous structure, a rigidity of a thin wall surface is very weak. However, in the bonding method, holding is performed at a bottom. Therefore, during milling machining, the honeycomb core is very prone to deformation, thereby severely affecting machining precision. A vacuum chuck fixture adsorbs the workpiece on a vacuum plate by using a principle of an atmospheric pressure difference. This method for adsorbing the plate to fix the workpiece requires sufficiently good sealing performance. That is, before machining, it needs to lay a sealing strip according to a machining technology of the workpiece. If a process of a through hole is machined, it needs to consider to avoid a position of the through hole during the laying of the sealing strip. Therefore, in this machining method, when a workpiece in a different process needs to be changed, a path of the sealing strip needs to be changed for relaying. In addition, during machining, unreliable sealing and a decrease or failure of a clamping force are caused, thereby affecting the machining precision. Another clamping manner is a manual fixture for clamping a periphery of an aluminum honeycomb plate. Although the fixture does not affect a clamping force during machining, because a size of the aluminum alloy honeycomb plate is relatively large, and the clamping force is not as close as possible to a machining region, deflection and deformation of a workpiece and generation of a vibration phenomenon are caused during machining, resulting in unreliable machining. In the foregoing clamping and fixing methods, all the clamping forces are not accurately calculated, but compared with an ordinary workpiece, the workpiece of the honeycomb structure has different structural features. Therefore, clamping cannot be performed by means of experience, and deformation or even collapse of the honeycomb core is caused if an excessively large or excessively small clamping force and a direction in which the clamping force is applied are not considered.

For an aspect of cooling and lubrication during milling of the workpiece of the honeycomb structure, there are generally the following several methods. Conventional pouring method: During milling machining, a large amount of cutting fluid is continuously sprayed to a machining region to achieve cooling and lubrication during machining, a cooling effect is achieved by using a convective heat exchange effect of the cutting fluid, and heat is taken away by using the flowing cutting fluid. During machining, a machined workpiece surface is covered by the cutting fluid, thereby increasing a heat exchange region, and a lubricating oil film is formed on the workpiece surface. The oil film can reduce friction of a milling cutter/workpiece surface and reduce cutting tool wear, and plays an excellent friction-reducing and antiwear role. However, due to a characteristic of a periodic porous thin wall of the honeycomb core, even if the large amount of cutting fluid is sprayed to the machining region, the machining surface cannot be covered with the large amount of cutting fluid, and the large amount of cutting fluid flows out from the honeycomb holes. In this way, the cutting fluid is more wasteful than that in a conventional pouring method of the workpiece. In addition, because the workpiece is formed by a hexagonal periodic thin wall, and a time during which a cutting tool is in contact with the thin wall is very short, consecutive chips cannot be formed during machining, the chips produced during cutting are fragmented, and the large amount of cutting fluid sprayed may block removal of the chips. As a result, the scraps are accumulated in the holes, which causes secondary damage to the workpiece.

A dry machining technology is the earliest green machining technology, and originates from the automobile industry. At present, the dry machining technology has been applied to machining forms such as turning, milling, drilling, and boring. It is not simply to completely abandon the cutting fluid, but to abolish the use of the cutting fluid while ensuring machining precision of the components and a service life of the cutting tool. However, dry cutting cannot ensure machining quality. When a workpiece of a honeycomb core is cut, scraps obtained after the cutting cannot be blown away in time, the scraps are accumulated on a material surface, and a lot of heat is transferred to the cutting tool and the workpiece. As a result, the workpiece is hardened twice, and the workpiece surface is burned and the cutting tool wear is increased. A minimum quantity lubrication technology, as another green machining technology after the dry machining technology, is a cutting machining technology in which a small amount of lubricating fluid and gas with a specific pressure are sprayed to a cutting region after being mixed and atomized, to play a cooling and lubrication role. Compared with the dry method and the conventional pouring method, the minimum quantity lubrication technology is more suitable for machining the honeycomb core, further ensures that sufficient cutting fluid can cover the honeycomb thin wall while saving the cutting fluid, and achieves highest efficiency. However, due to limitations of an existing minimum quantity lubrication apparatus, in external minimum quantity lubrication, a nozzle position is generally manually adjusted, and after the adjustment is completed, the machining process cannot be changed again. However, a nozzle spray position is adjusted within an optimal range of set angle parameters instead of being fixed at a specific point, which is more suitable for engineering applications, and more ideal cutting performance can be obtained under an acceptable deviation within the range.

In summary, the inventor finds that the honeycomb plate cannot move when being bonded or adsorbed once by using the bonding method and the vacuum adsorption method. Therefore, positioning errors are often very prone to occur during bonding and adsorption, and an unreliable holding force causes form and position errors during machining. However, the method for performing fixing and clamping at a periphery causes deflection and deformation of the workpiece and generation of a vibration phenomenon during machining. In cooling and lubrication during milling of the honeycomb plate, conventional cutting fluid is not environmentally friendly enough, it is a waste for such a workpiece, namely, a honeycomb thin wall member that has a very small contact surface, and the generated scraps are accumulated by the cutting fluid, causing secondary damage to the workpiece. The dry method cannot ensure machining quality, and difficulty in scrap removal also causes the secondary damage. However, angles of most of the existing minimum quantity lubrication apparatuses cannot be adjusted during machining, and nozzle angles are not suitable for the workpieces of the honeycomb structure. The honeycomb plate is mainly applied to the equipment compartment bottom plate in rail transit core components to prevent sandstones from damaging in-vehicle equipment. As the mass-produced workpieces, the foregoing several clamping methods have huge labor costs, are time-consuming and laborious, and are not suitable for high-efficiency mass production. In addition, in the several clamping methods, form and position errors are prone to occur when the honeycomb plate is machined, resulting in assembly error accumulation of the honeycomb plate that has been machined at a later stage, and in severe cases, the bottom plate may fall off under the huge external impact during running of a rail vehicle due to unreliable mounting, causing damage to vehicle equipment. Therefore, great safety hazards exist. When the honeycomb plate is milled, because an adjustment of jet flow parameters is not considered from a perspective of a special structure of the honeycomb, when the conventional method of the cutting fluid and the dry method are used, many defects of the honeycomb core are caused. The strength of the honeycomb core in a T direction is reduced, the cushioning performance is deteriorated when the equipment compartment bottom plate of the rail vehicle is applied, and in long-term service, the rail vehicle may be damaged in advance, leading to accidents. In addition, honeycomb aluminum alloy has relatively low rigidity, and is prone to deformation under the action of the clamping force for positioning and mounting, and an excessively small clamping force is required. Although the clamping deformation is reduced, the unreliable positioning and mounting cannot meet requirements of the machining precision, which is a current technical problem for high-quality machining of a rail transit large-scale honeycomb aluminum alloy such as a high-speed railway and a subway.

SUMMARY

Aiming at the defects in the prior art, an objective of the present invention is to provide a positioning system with an adjustable clamping force and a milling equipment for a rail transit honeycomb workpiece. A mechanical arm of the positioning system can perform linkage work, to ensure that a pressing force is always within a proper range and always implements pressing near a machining region of a workpiece, thereby improving the accuracy of a clamping force and the reliability of machining, and reducing labor intensity.

To achieve the foregoing objective, the present invention is implemented through the following technical solutions:

According to a first aspect, an embodiment of the present invention provides a positioning system with an adjustable clamping force for a rail transit honeycomb workpiece, including:

a positioning apparatus, including a positioning table to support a workpiece; and a clamping apparatus, including a turntable, where the turntable is fixedly disposed on a periphery of the positioning table, a top of the turntable is connected to a mechanical arm, a pressure plate is disposed at an end of the mechanical arm, and the pressure plate is capable of cooperating with the positioning table to clamp the workpiece, where there are a plurality of clamping apparatuses, working regions of adjacent clamping apparatuses have an intersection, and working regions of all the clamping apparatuses are capable of covering a machining surface of the workpiece; and when machining is performed in an intersection region, a clamping apparatus corresponding to the region clamps the workpiece, and when machining is performed in a non-intersection region, a clamping apparatus corresponding to the region dodges, and an adjacent clamping apparatus clamps the workpiece.

As a further technical solution, the mechanical arm includes a main arm connected to the turntable, the main arm is hinged with a side portion of a middle arm, the middle arm is connected to the pressure plate by an end joint, the main arm and the middle arm are capable of swinging up and down independently, and the end joint is capable of driving the pressure plate to rotate in a direction of a plate surface of the pressing plate, so that the pressure plate is always parallel to a workpiece surface.

As a further technical solution, an end portion of the middle arm is further hinged with a connecting rod, the connecting rod is hinged with a rocker that swings up and down, the rocker is connected to the main arm, and the rocker and the main arm swing independently.

As a further technical solution, the connecting rod is disposed in parallel to the main arm, and a connection point between the connecting rod and the middle arm, a connection point between the connecting rod and the rocker, a connection point between the main arm and the middle arm, and a connection point between the main arm and the rocker are connected to form a parallelogram.

As a further technical solution, a pressure sensor is inserted into the pressure plate, and an end surface of the pressure sensor is flush with an end surface of the pressure plate.

As a further technical solution, the turntable includes a main rotating body that is rotatable horizontally, and the main rotating body is connected to the main arm; and the main rotating body and the pressure plate rotate synchronously, and have a same rotation angle and opposite rotation directions, to keep the pressure plate and the workpiece always pressed in a same orientation.

As a further technical solution, a plurality of positioning adjustment apparatuses are fixedly disposed on a peripheral side of the positioning table, to implement six-point positioning of the workpiece; the positioning adjustment apparatus includes a positioning element, and a bottom of the positioning element is connected to an up-and-down reciprocating apparatus to adjust a height of the positioning element; and the positioning element is higher than the positioning table to position a side portion of the workpiece.

According to a second aspect, an embodiment of the present invention further provides a milling equipment for a rail transit honeycomb workpiece, including the positioning system with an adjustable clamping force described above.

As a further technical solution, the milling equipment further includes a milling machine, where the milling machine is connected to a minimum quantity lubrication spray angle control apparatus by a machine tool spindle, the minimum quantity lubrication spray angle control apparatus is connected to a nozzle, and the minimum quantity lubrication spray angle control apparatus is disposed above the positioning table.

As a further technical solution, the minimum quantity lubrication spray angle control apparatus includes a high elevation rod, the high elevation rod is connected to a low elevation mechanism, the low elevation mechanism is connected to the nozzle to finely adjust a nozzle elevation, and the nozzle is connected to an atomizer by a universal joint cooling pipe.

As a further technical solution, the high elevation rod is hinged with a spindle connecting member to coarsely adjust the nozzle elevation, the spindle connecting member is connected to the machine tool spindle, and the nozzle extends to a milling cutter at a bottom of the machine tool spindle; and the spindle connecting member is of an arc-shaped plate-type structure, and the arc-shaped plate-type structure is engaged outside the machine tool spindle.

As a further technical solution, the low elevation mechanism includes a low elevation rotating member that is rotatable in a vertical direction, the low elevation rotating member has a groove to accommodate and fix a horizontal swing angle mechanism, the horizontal swing angle mechanism includes a ball joint rotating member, the ball joint rotating member is connected to the nozzle, and the ball joint rotating member is rotatable in a horizontal direction to drive the nozzle to adjust a horizontal swing angle. A high elevation adjustment mechanism performs a first-step coarse adjustment, the low elevation mechanism performs a second-step fine adjustment, and the horizontal swing angle mechanism adjusts a horizontal swing angle of the nozzle.

As a further technical solution, a horizontal swing angle range of the nozzle is [15°-45°]. An analysis of an angle position and a target distance parameter of a minimum quantity lubrication nozzle is to determine a proper elevation $\alpha$ range by using a flow field formed by a shape of a cutting tool, a milling manner, and a rotation speed of a milling cutter, and after an elevation is obtained, a critical target distance when a micro-droplet is sprayed on a thin wall surface to form an "adhesion" state is analyzed. Furthermore, for a periodic porous thin wall structure of a honeycomb, the spreadability of the micro-droplet is analyzed from an incident angle, to obtain a proper horizontal swing angle range of the nozzle.

Beneficial effects of the foregoing embodiments of the present invention are as follows:

In the positioning system in the present invention, a large aluminum alloy honeycomb plate is mounted and clamped by using a mechanical structure, which has higher efficiency and is more friendly to a machining environment; and a mechanical arm of the clamping apparatus can perform linkage work, to ensure that a pressing force is always within a proper range and always implements pressing near a machining region of a workpiece, thereby improving the accuracy of a clamping force and the reliability of machining, and reducing labor intensity.

In the milling equipment in the present invention, the minimum quantity lubrication spray angle control apparatus can adjust an elevation through cooperation between the high elevation mechanism and the low elevation mechanism, and can automatically adjust an angle of a spray nozzle according to a feature of the machining workpiece, thereby alleviating the limitation that the conventional spray nozzle can only be fixed during single machining, improving the degree of automation, so that the micro-droplet can be better sprayed to the required machining region in combination with a working condition, to improve the machining quality.

In the milling equipment in the present invention, the minimum quantity lubrication spray angle control apparatus can further adjust a specific spray distance (that is, a target distance) through cooperation between the high elevation mechanism and the low elevation mechanism, so that the sprayed micro-droplet can be better "adhered" to the workpiece surface, thereby achieving a better lubrication effect.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

Figure 1:
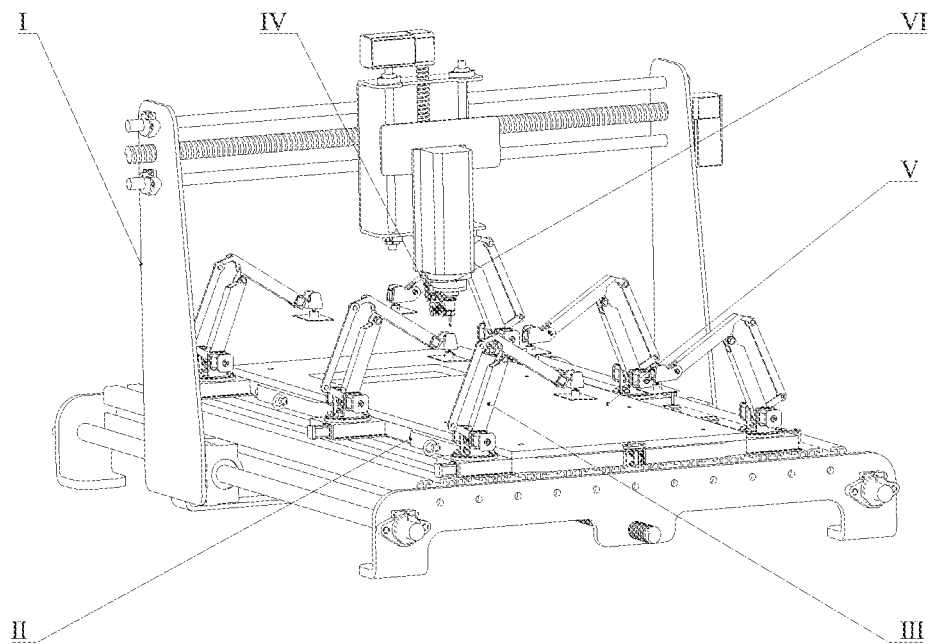
FIG. 1 is an overall schematic diagram of a milling equipment in Embodiment 1 of the present invention.

In the drawings, to show positions of parts, a distance or a size between the parts is exaggerated, and schematic diagrams are only used for illustration, where I large dynamic beam-type gantry milling machine, II machine tool fixture positioning apparatus, III machine tool fixture clamping apparatus, IV minimum quantity lubrication spray angle control apparatus, V aluminum alloy honeycomb plate, and VI machine tool spindle; II-1 positioning table, II-1-1 threaded hole, II-1-2 pin shaft, and II-1-3 mounting base; II-2 positioning adjustment apparatus, and II-3 lifting ring; III-1 turntable, III-1-1 mounting base, III-1-2 stepped shaft hole, III-1-3 cylindrical cavity, and III-1-4 threaded hole; III-2 stepped shaft, and III-2-1 groove; III-3 tapered roller bearing, III-4 worm gear, III-5 inner hexagon screw, III-6 main rotating body, III-7 bearing retaining ring, III-8 shaft end cover, III-9 inner hexagon screw, III-10 worm shaft, III-10-1 shaft ring, III-11 deep groove ball bearing, III-12 coupling, III-13 turntable drive motor, III-13-1 motor shaft, III-14 inner hexagon screw, III-15 drive motor, III-16 support plate, III-17 outer hexagon screw, III-18 tapered roller bearing, III-19 connecting member, III-20 main arm, III-21 deep groove ball bearing, III-22 rocker, III-22-1 hole, III-23 tapered roller bearing, III-24 drive motor, III-25 inner hexagon screw, III-26 inner hexagon screw, III-27 pin, III-28 connecting rod, III-28-1 hole, III-28-2 hole, III-29 pin, III-30 sleeve, III-31 middle arm, III-31-1 hole, III-31-2 hinged support, III-32 pin, III-33 pin connecting sleeve, III-34 pin, III-35 pin connecting sleeve, III-36 pin, III-37 end joint drive motor, III-38 fastening screw, III-39 end joint, III-40 end fastening member, III-41 front end small motor, III-42 fastening screw, III-43 pressure plate, III-44 pressure sensor, and III-45 screw; IV-1 spindle connecting member, IV-1-1 arc structure, IV-1-2 threaded hole, IV-1-3 through hole, IV-1-4 threaded hole, IV-2 cross recessed screw, IV-3 hinged support, IV-3-1 end threaded hole, IV-3-2 hexagonal groove, IV-4 high elevation rod, IV-4-1 through hole, IV-4-2 through hole, IV-4-3 through hole, IV-5 hexagonal fastening nut, IV-6 angle fastening bolt, IV-7 housing, IV-7-1 threaded hole, IV-7-2 stepped inner hole, IV-7-3 stepped through hole, IV-7-4 threaded hole, IV-8 cross recessed screw, IV-9 servo motor, IV-9-1 motor shaft, IV-10 cross recessed pan head screw, IV-11 motor bracket, IV-11-1 threaded hole, IV-12 cross recessed screw, IV-13 pin, IV-14 coupling sleeve, IV-15 shaft, IV-16 bevel gear, IV-17 round end key, IV-18 baffle plate, IV-19 screw, IV-20 bevel gear, IV-21 shaft, IV-22 deep groove ball bearing, IV-23 round end key, IV-24 sleeve, IV-25 deep groove ball bearing, IV-26 sleeve, IV-27 straight gear, IV-28 round end key, IV-29 sleeve, IV-30 deep groove ball bearing, IV-31 end housing, IV-32 cross recessed pan head screw, IV-33 middle plate, IV-34 low elevation rotating member, IV-34-1 through hole, IV-34-2 spherical surface, IV-34-3 flat structure, IV-35 countersunk screw, IV-36 straight gear, IV-37 sleeve, IV-38 deep groove ball bearing, IV-39 pan head screw, IV-40 ball joint rotating member, IV-40-1 flat through hole, IV-41 shaft, IV-42 synchronous pulley pin, IV-43 synchronous belt, IV-44 synchronous pulley, IV-45 synchronous pulley, IV-46 countersunk screw, IV-47 deep groove ball bearing, IV-48 steering gear bracket, IV-48-1 flat through hole, IV-49 synchronous pulley pin, IV-50 steering gear, IV-50-1 steering gear shaft, IV-51 nozzle, IV-52 universal joint cooling pipe, and IV-53 atomizer; and VI-1 sleeve, and VI-2 front cover.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

Table 1 shows a process route solution for machining an aluminum alloy honeycomb plate V. It can be learned from the table that in a process 30, the aluminum alloy honeycomb plate V needs to be first positioned and clamped. Nowadays, there are generally three types of fixtures applied to the honeycomb plate. A first type is a bonding method in which a honeycomb bottom plate is bonded for positioning and holding. This manner also has obvious defects of being not environmentally friendly, increasing a labor amount, prolonging a production cycle, and being time-consuming and laborious. A second type is a vacuum adsorption method in which a workpiece is adsorbed on a vacuum plate by using a principle of an atmospheric pressure difference. This method for adsorbing the plate to fix the workpiece requires sufficiently good sealing performance. That is, before machining, it needs to lay a sealing strip according to a machining technology of the workpiece. If a process of a through hole is machined, it needs to consider to avoid a position of the through hole during the laying of the sealing strip. Therefore, in this machining method, when a workpiece in a different process needs to be changed, a path of the sealing strip needs to be changed for relaying. In addition, during machining, unreliable sealing and a decrease or failure of a clamping force are caused, thereby affecting the machining precision. A third type is a fixture for clamping a periphery of an aluminum honeycomb plate. Although the fixture does not affect a clamping force during machining, because a size of the aluminum alloy honeycomb plate V is relatively large, and the clamping force is not as close as possible to a machining region, unreliable machining is caused. Therefore, if the pressure plate can perform pressing near the required machining region, and as a cutting path of a machine tool spindle changes, the pressure plate can always implement pressing in real time near the machining region according to a program of the cutting path, that is, implement pressing along with a movement, the defects in the foregoing several clamping manners can be well resolved.

TABLE 1

Process route solution for machining aluminum alloy honeycomb plate

| Process number | Process name | Process content | Machining equipment |
|---|---|---|---|
| 10 | Hot pressing | Hot-press an aluminum honeycomb and an aluminum plate into a honeycomb plate blank through composite molding | Hot-pressing machine |
| 20 | Check | Check the honeycomb plate blank | |
| 30 | Milling | Perform high-speed vertical milling of a through hole and a through cavity (where a lower plate of the honeycomb plate is referred to as a rough reference) | Gantry milling machine |
| 40 | Deburring | Remove sharp edges and burrs, and blow chips | |
| 50 | Final check | Check according to requirements of a check process card | |

Embodiment 1

In a typical implementation of the present invention, as shown in FIG. 1, a clean intelligent milling equipment for a honeycomb workpiece is provided, including a large dynamic beam-type gantry milling machine I, a machine tool fixture positioning apparatus II, a machine tool fixture clamping apparatus III, a minimum quantity lubrication spray angle control apparatus IV, and a machine tool spindle VI. The machine tool fixture positioning apparatus II and the machine tool fixture clamping apparatus III jointly form a machine tool fixture, which is mounted on a machine tool table to position and clamp a honeycomb aluminum alloy workpiece (for example, an aluminum alloy honeycomb plate V). The minimum quantity lubrication spray angle control apparatus IV is mounted on a front cover of the machine tool spindle VI, and a spray nozzle is mounted on the minimum quantity lubrication spray angle control apparatus IV. A machining workpiece is an equipment compartment bottom plate of a high-speed train. The bottom plate is the aluminum alloy honeycomb plate V, uses an aluminum honeycomb core as a middle core material, and is formed by compositing and machining upper and lower aluminum alloy plates.

The large dynamic beam-type gantry milling machine I is a three-axis dynamic beam-type milling machine. That is, movements in three directions of X, Y, and Z are all driven by using a screw rod driven by a motor, and the rotation of the screw rod drives a slider to move along a direction of the screw rod, to implement movements of the machine tool spindle in the three directions of X, Y, and Z.

Figure 2:
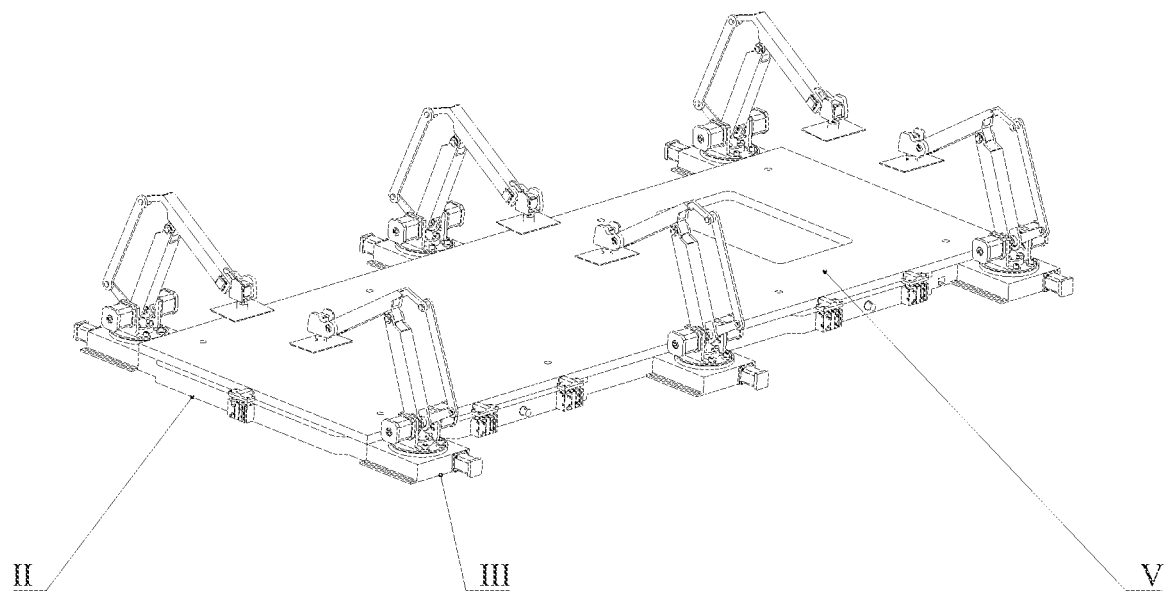
FIG. 2 is an overall structure diagram of a machine tool fixture in Embodiment 1 of the present invention.

FIG. 2 is an overall structure diagram of a machine tool fixture. The machine tool fixture positioning apparatus II and the machine tool fixture clamping apparatus III are respectively independent entities, and six machine tool fixture clamping apparatuses III are arranged on two sides of the machine tool fixture positioning apparatus II to form a whole machine tool fixture. The aluminum alloy honeycomb plate V is placed on the machine tool fixture positioning apparatus II.

Figure 3:
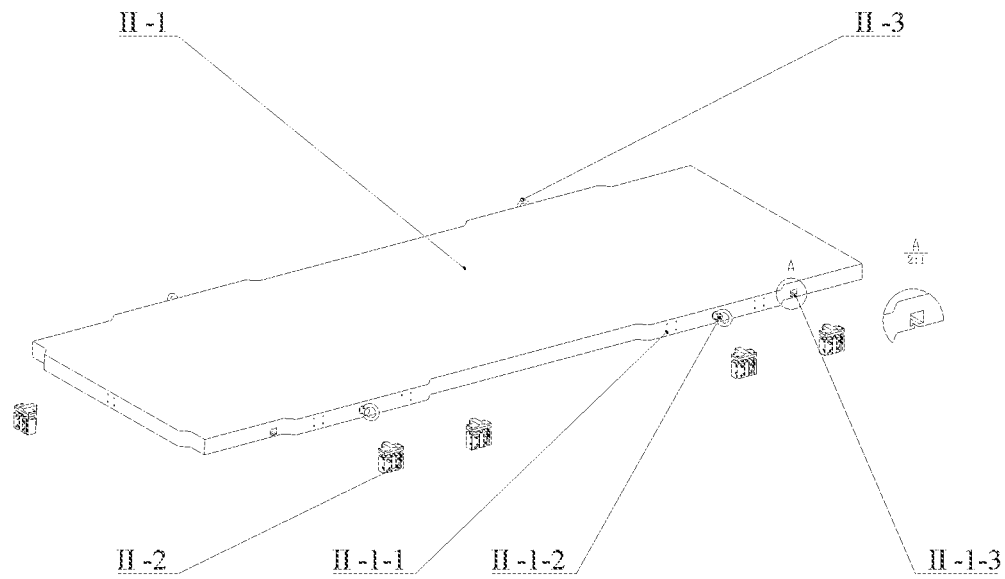
FIG. 3 is an exploded view of a machine tool fixture positioning apparatus II in Embodiment 1 of the present invention.

FIG. 3 is an exploded view of a machine tool fixture positioning apparatus II. As shown in FIG. 3, the machine tool fixture positioning apparatus II includes a positioning table II-1, a positioning adjustment apparatus II-2, and a lifting ring II-3.

The positioning adjustment apparatus includes a cylinder and a positioning element, the positioning element is disposed at a top of the cylinder, and a height of the positioning element may be adjusted through a cylinder action. The cylinder may adjust the height of the positioning element according to a thickness of the workpiece, to improve the positioning reliability during machining.

A threaded hole II-1-1 is provided on the positioning table II-1, and the cylinder of the positioning adjustment apparatus II-2 is fixedly mounted on the positioning table II-1 by using screws. To meet a six-point positioning principle, one positioning adjustment apparatus II-2 is arranged in a center line of a wide side of the positioning table II-1, four positioning adjustment apparatuses II-2 are arranged on a long side of the positioning table II-1, and the positioning element is higher than the positioning table, and may be attached to a side portion of the aluminum alloy honeycomb plate.

The positioning table II-1 serving as a main positioning surface of the aluminum alloy honeycomb plate V limits a movement freedom of a Z axis and rotational freedoms of an X axis and a Y axis of the workpiece, and the four positioning adjustment apparatuses II-2 on the long side and the one positioning adjustment apparatus II-2 on the wide side are used for limiting movement freedoms of the X axis and the Y axis and a rotational freedom of the Z axis. After the six-point positioning principle is met, it is considered that the workpiece is generally in a shape of a cuboid and is a large workpiece. Therefore, if fewer positioning adjustment apparatuses II-2 on the long side are used as positioning members, because a size of the workpiece is excessively large, and problems such as an offset of a position of the workpiece during milling machining and unreliable positioning may be caused, the positioning adjustment apparatuses II-2 are evenly arranged to ensure reliable positioning of the workpiece during machining.

The lifting ring II-3 is arranged for hoisting the large fixture, and is mounted on four pin shafts II-1-2 on the positioning table II-1.

A mounting base II-1-3 is disposed on the positioning table II-1, and is used for mounting with the machine tool table in a connection manner.

The machine tool fixture clamping apparatus III includes a turntable and a mechanical arm disposed on the turntable. A structure of the machine tool fixture clamping apparatus is described below.

Figure 4:
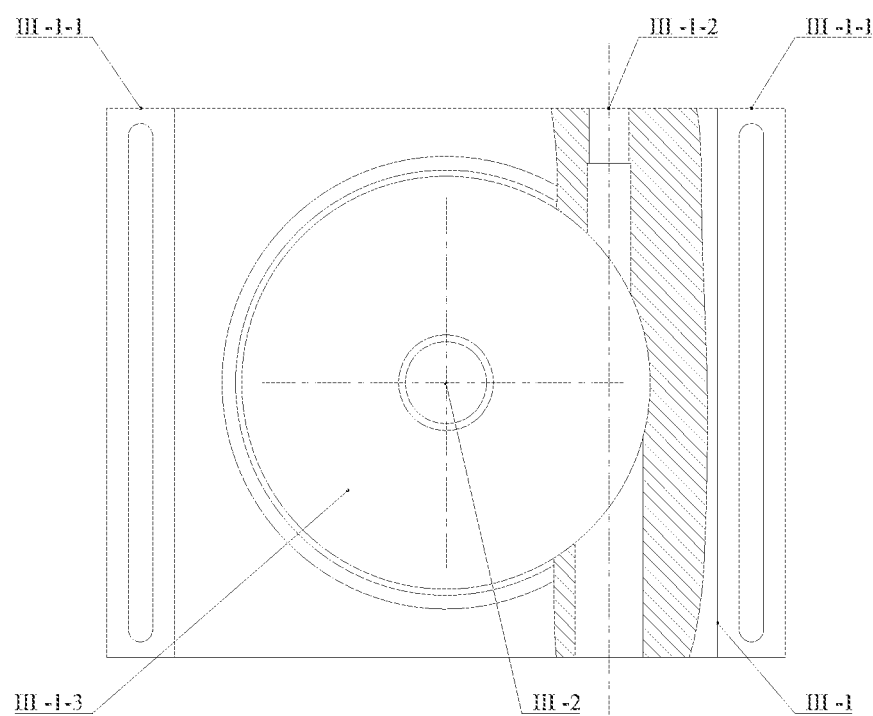
FIG. 4 a partial cross-sectional view of a turntable in Embodiment 1 of the present invention.
Figure 5:
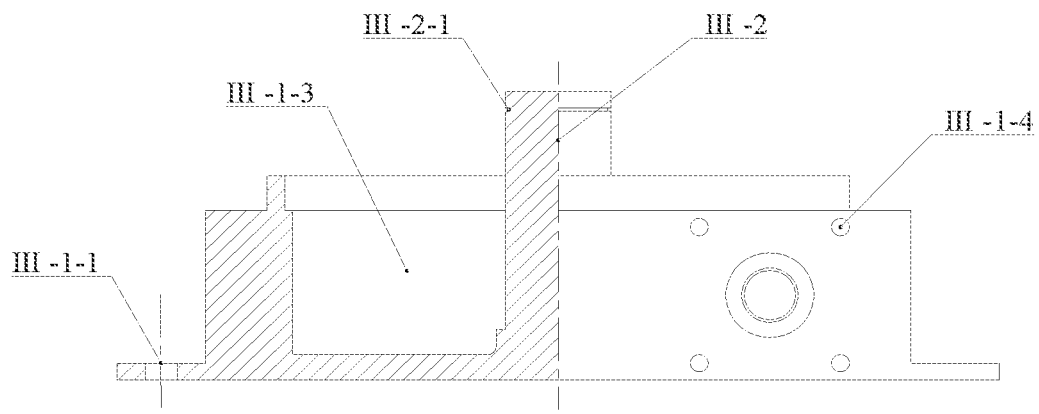
FIG. 5 is a semi-sectional view of the turntable in Embodiment 1 of the present invention.

FIG. 4 and FIG. 5 are structural diagrams of a turntable. As shown in the figures, mounting bases III-1-1 are disposed on two sides of the turntable III-1, and are used for mounting with the machine tool table in a connection manner. In addition, a stepped shaft hole III-1-2 with a gradually decreased radius and a cylindrical cavity III-1-3 are machined on the turntable III-1, the stepped shaft hole III-1-2 is disposed horizontally, and the cylindrical cavity III-1-3 is disposed vertically. A stepped shaft III-2 provided with a groove III-2-1 is fixedly welded to a center of the cylindrical cavity III-1-3 in a welding manner to form an overall structural member with the turntable III-1.

Figure 6:
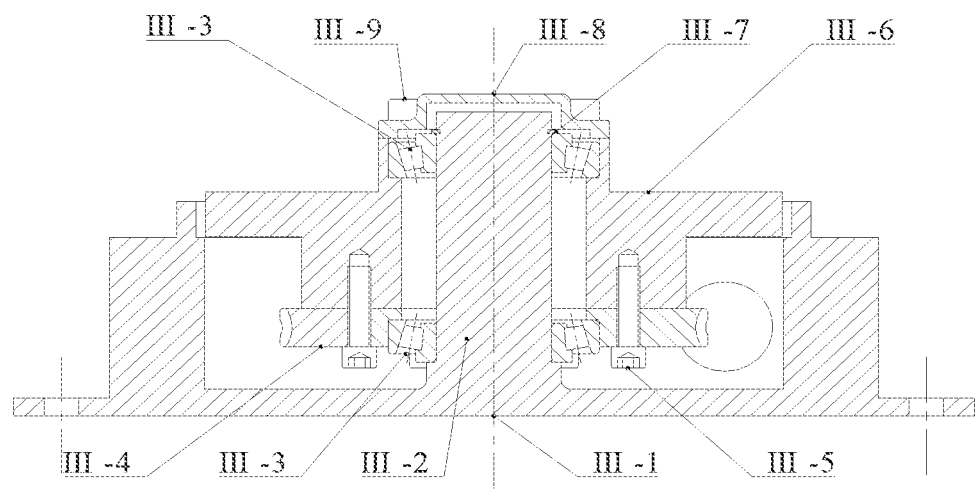
FIG. 6 is a cross-sectional view of mounting a turntable worm gear structure in Embodiment 1 of the present invention.

FIG. 6 is a diagram of mounting a turntable worm gear structure. Two tapered roller bearings III-3 are mounted on upper and lower stepped shafts III-2. Cooperation between an inner hole of the lower tapered roller bearing III-3 and the stepped shaft III-2 uses a basic hole system, that is, uses a size of the inner hole of the bearing as a reference; and cooperation between an outer diameter of the lower tapered roller bearing III-3 and an inner hole of a worm gear III-4 uses a basic shaft system, that is, uses a size of the outer diameter of the bearing as a reference. The worm gear III-4 and a main rotating body III-6 are both provided with a threaded hole, and are connected by an inner hexagon screw III-5. An inner diameter of the other end of the main rotating body III-6 fits with an outer diameter of an upper tapered roller bearing III-3 by using the basic shaft system, an inner hole of the upper tapered roller bearing III-3 fits with the stepped shaft III-2 by using the basic hole system, and a bearing retaining ring III-7 is disposed on the stepped shaft III-2 to fix an axial position of the tapered roller bearing III-3. A shaft end cover III-8 is disposed at a shaft end, and is connected to the main rotating body III-6 by an inner hexagon screw III-9.

Figure 7:
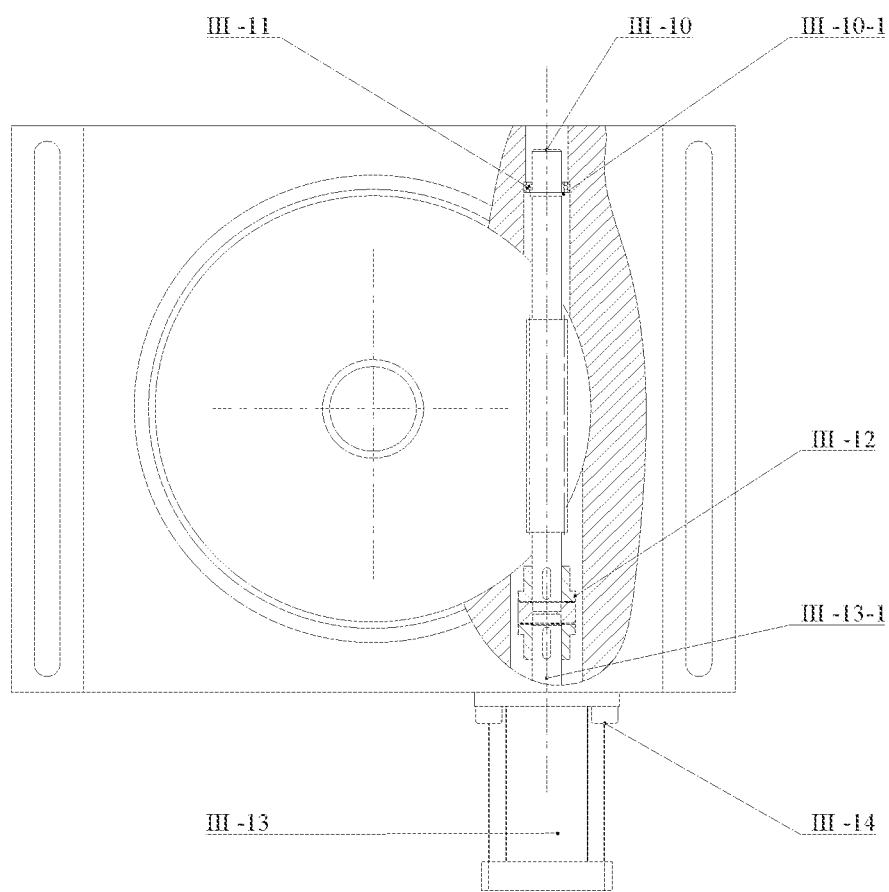
FIG. 7 is a partial cross-sectional view of mounting a turntable worm structure in Embodiment 1 of the present invention.

FIG. 7 is a diagram of mounting a turntable worm structure. A worm shaft III-10 is provided with a shaft ring III-10-1, inner holes of a deep groove ball bearing III-11 and the worm shaft III-10 are in a cooperation manner of the basic hole system, and the shaft ring III-10-1 positions a position of an inner ring of the deep groove ball bearing III-11. An outer diameter of the deep groove ball bearing III-11 and a stepped shaft hole III-1-2 of the turntable III-1 are in a cooperation manner of the basic shaft system, and a hole shoulder of the shaft hole III-1-2 is responsible for positioning a position of an outer ring of the deep groove ball bearing III-11. The other end of the worm shaft III-10 and a motor shaft III-13-1 of a turntable drive motor III-13 are jointly connected to a coupling III-12, and a torque is transmitted by using a round end key. The turntable drive motor III-13 is fixed on the turntable III-1 by using an inner hexagon screw III-14, and four inner hexagon screws III-14 fit with four threaded holes III-1-4 of the turntable III-1 respectively.

The worm gear structure and the worm structure fit with each other. That is, a worm gear III-4 in FIG. 6 fits with a worm shaft III-10 in FIG. 7. When the turntable drive motor III-13 rotates, the motor shaft III-13-1 transmits a torque by using the coupling III-12, drives the worm shaft III-10 to rotate, and under the cooperation between a worm and a worm gear, drives the worm gear III-4 to rotate, to implement rotation of the main rotating body III-6.

Figure 8:
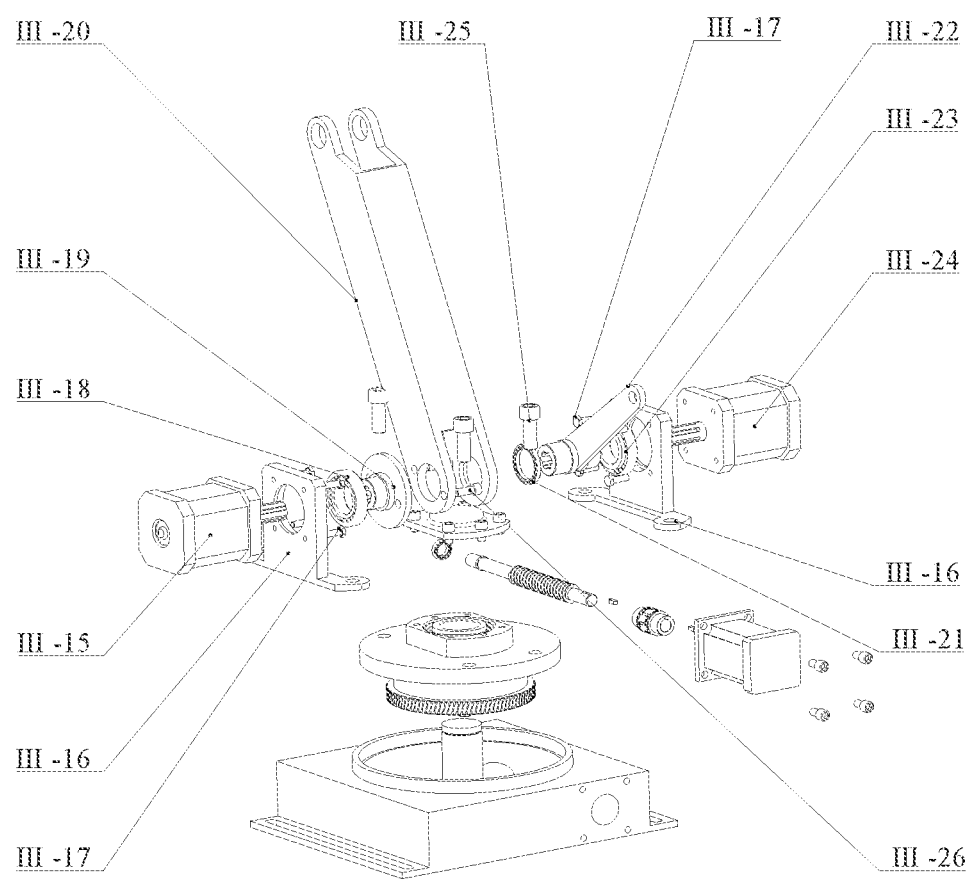
FIG. 8 is a schematic diagram of cooperation between a main arm of a mechanical arm and the turntable in Embodiment 1 of the present invention.

FIG. 8 is a schematic diagram of cooperation between a main arm of a mechanical arm of the machine tool fixture clamping apparatus III and the turntable. A drive motor III-15 and a support plate III-16 are connected and fixed by an external hexagon screw III-17. An outer ring of a tapered roller bearing III-18 fits with an inner hole of the support plate III-16 by using the basic shaft system, and the outer ring of the bearing is used as a reference. An outer ring shaft of a connecting member III-19 fits with an inner ring of the tapered roller bearing III-18 by using the basic hole system, and the inner ring of the bearing is used as a reference. The other end of the connecting member III-19 is fixedly connected to a main arm III-20 by an inner hexagon screw III-26. An outer spline of a motor shaft of the drive motor III-15 fits with an inner spline of the connecting member III-19. When rotating, the drive motor III-15 transmits a torque by using a spline structure to make the connecting member III-19 rotate, so that the drive motor III-15 precisely controls an up-and-down swing angle of the main arm III-20. An inner hole on the other side of the main arm III-20 fits with an outer ring of a deep groove ball bearing III-21 by using the basic shaft system, and the outer ring of the bearing is used as a reference. An inner ring of the deep groove ball bearing III-21 fits with an end shaft of a rocker III-22 by using the basic hole system, and the inner ring of the bearing is used as a reference. The other end shaft of the rocker III-22 fits with a tapered roller bearing III-23 by using the basic hole system, and the inner ring of the bearing is used as a reference. An outer ring of a tapered roller bearing III-23 fits with an inner hole of the support plate III-16 by using the basic shaft system, and the outer ring of the bearing is used as a reference. The support plate III-16 and a drive motor III-24 are connected and fixed by the external hexagon screw III-17. An outer spline of a motor shaft of the drive motor III-24 fits with an inner spline of the rocker III-22. When rotating, the drive motor III-24 transmits a torque by using the spline structure, so that the drive motor III-24 precisely controls swinging of an up-and-down swing angle of the rocker III-22. Two support plates III-16 are mounted to the main rotating body III-6 by using four inner hexagon screws III-25 with a relatively large size, so that when the turntable drive motor III-13 rotates, a horizontal left-and-right swing angle of the mechanical arm can be finally precisely controlled.

Figure 9:
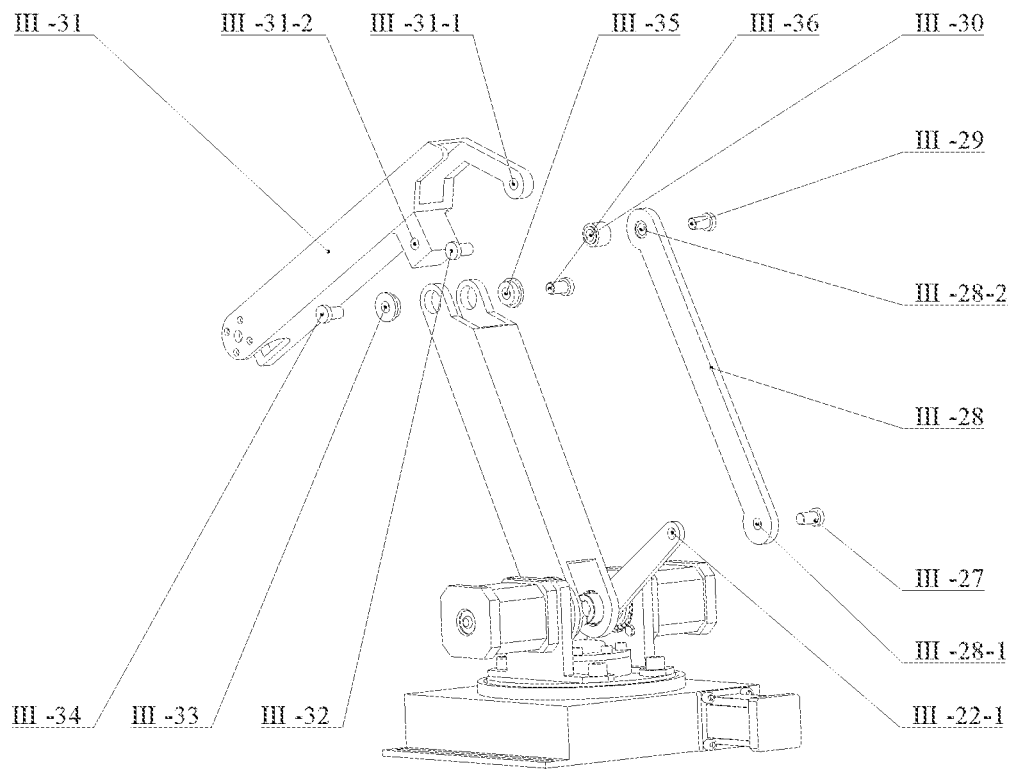
FIG. 9 is a schematic diagram of connection cooperation between a middle arm of the mechanical arm and the main arm in Embodiment 1 of the present invention.

FIG. 9 is a schematic diagram of connection cooperation between a middle arm of the mechanical arm and the main arm. A pin III-27 and a hole III-28-1 of a connecting rod III-28 are connected in a manner of clearance fit, the pin and the hole are rotatable freely, and the pin III-27 and a hole III-22-1 of the rocker III-22 are then connected in a manner of interference fit. A pin III-29 and a hole III-28-2 of the connecting rod III-28 are connected in a manner of clearance fit, and the pin and the hole are rotatable freely. The pin III-29 is in interference fit with a sleeve III-30. A pin III-32 is in clearance fit with a hole III-31-1 of a middle arm III-31, and the pin III-32 is then in interference fit with the sleeve III-30. A hinged support III-31-2 is welded at a lower end of the middle arm III-31, and a hole of the hinged support III-31-2 is provided between inner sides of two holes of the main arm III-20, and is co-axially assembled. A sleeve connected by a pin III-33 and a sleeve connected by a pin III-35 are respectively in interference fit with outer sides of the two holes of the main arm III-20, a pin III-34 and a pin III-36 are respectively in clearance fit with the sleeve connected by the pin III-33 and the sleeve connected by the pin III-35, and the pin III-34 and the pin III-36 are then in interference fit with an inner hole of the hinged support III-31-2, so that the middle arm III-31 can swing freely relative to the main arm III-20.

Figure 10:
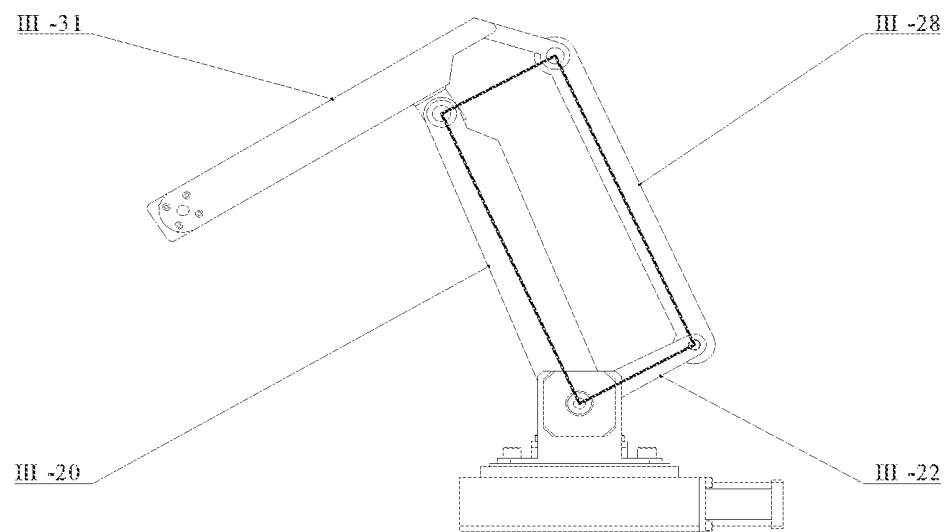
FIG. 10 is a diagram of a size relationship of the mechanical arm in Embodiment 1 of the present invention.

FIG. 10 is a diagram of a size relationship of the mechanical arm. As shown in the figure, a distance between centers of two end holes of the main arm III-20 is equal to a distance between centers of two end holes of the connecting rod III-28, and a distance between a center of a hole of the hinged support III-31-2 of the middle arm III-31 and a center of the hole III-31-1 is equal to a distance between centers of two end holes of the rocker III-22. As shown in the figure, connecting lines of four dots form a parallelogram. Therefore, when the main arm III-20 does not swing, and the rocker III-22 swings at a specific angle, it can be learned according to characteristics of the parallelogram that an angle at which the middle arm III-31 swings around the hinged support III-31-2 is equal to an angle at which the rocker III-22 swings. In other words, the drive motor III-24 can precisely control the swing angle of the middle arm III-31.

Figure 11:
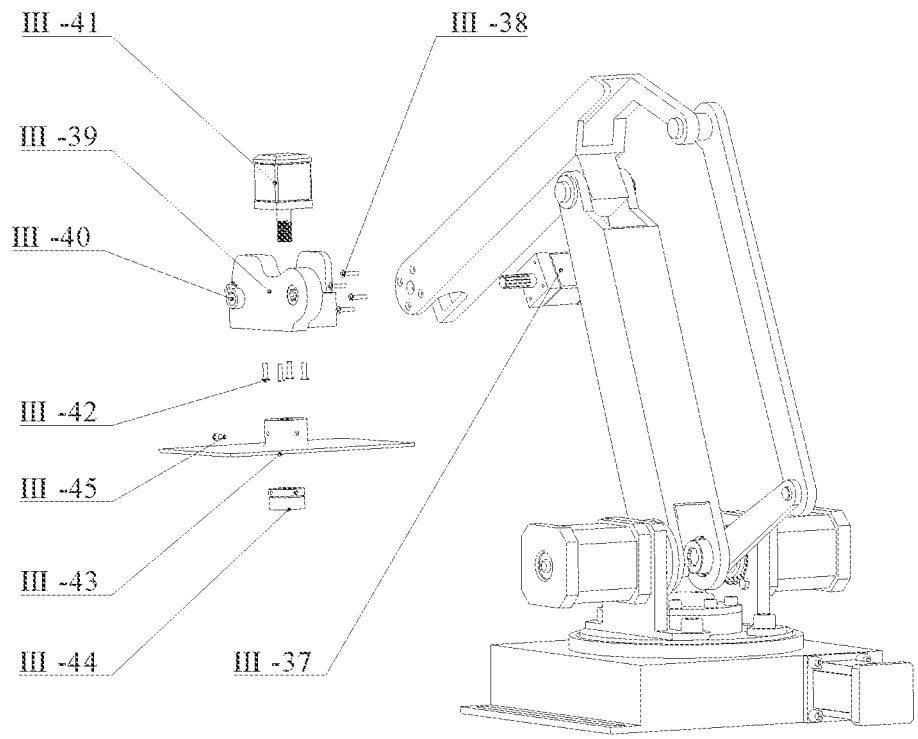
FIG. 11 is a schematic diagram of cooperation between an end joint of the mechanical arm and the middle arm in Embodiment 1 of the present invention.

FIG. 11 is a schematic diagram of connection cooperation between an end joint of the mechanical arm and the middle arm. As shown in the figure, an end joint drive motor III-37 is mounted at an end portion of the middle arm III-31, and is fixedly connected to the end portion of the middle arm III-31 by four fastening screws III-38. An inner spline hole of an end joint III-39 fits with an outer spline structure of a motor shaft of the end joint drive motor III-37, so that the end joint drive motor III-37 precisely drives the end joint III-39 to swing. An end fastening member III-40 is mounted at an end portion of the motor shaft of the end joint driver motor III-37, and is responsible for preventing the end joint III-39 from axially moving. A front end small motor III-41 is placed in the end joint III-39, and is fixedly connected to the end joint III-39 by four fastening screws III-42. A threaded hole is provided inside an upper end of a pressure plate III-43, and fits with a thread of a motor shaft of the front end small motor III-41 for locking and fastening, and the front end small motor III-41 is responsible for controlling horizontal rotation of the pressure plate III-43. A surface pressure sensor III-44 is placed inside the pressure plate III-43, and is mounted and fixed together with the pressure plate by a screw III-45.

Figure 12:
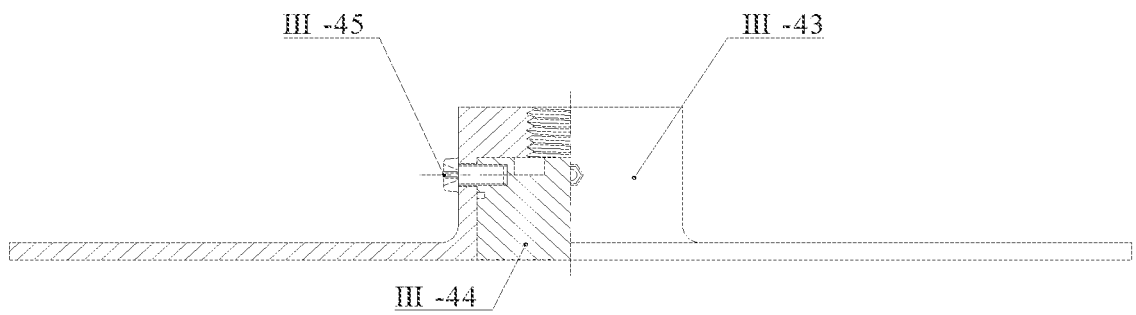
FIG. 12 is a semi-sectional view of a pressure plate in Embodiment 1 of the present invention.

FIG. 12 is a semi-sectional schematic diagram of a pressure plate. As shown in the figure, a lower end surface of the surface pressure sensor III-44 is flush with a lower end surface of the pressure plate III-43. When the pressure plate III-43 is in contact with the workpiece surface, the surface pressure sensor III-44 starts to work, and feeds back in real time a pressing force applied by the pressure plate III-43, to ensure that the mechanical arm always applies a proper pressing force. The apparatus may perform calculation according to a size parameter of a single honeycomb cell of the aluminum alloy honeycomb plate and a coverage area of the pressure plate and apply a pressing force within a proper range.

Figure 13:
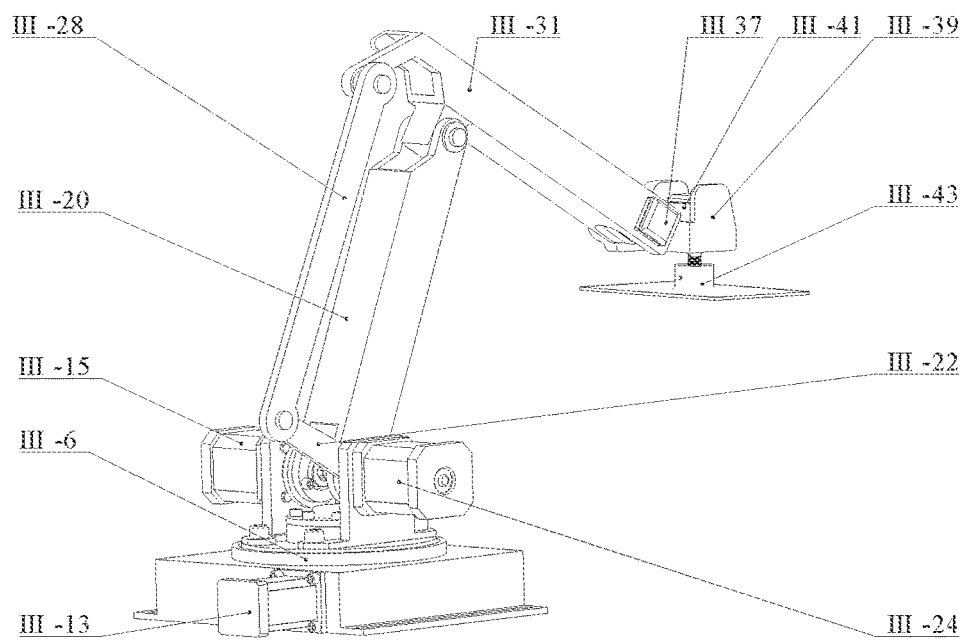
FIG. 13 is a final assembly diagram of the mechanical arm in Embodiment 1 of the present invention.

Herein, the structures of the parts of the mechanical arm have been introduced. FIG. 13 is a final assembly diagram of the machine tool fixture clamping apparatus III. The turntable drive motor III-13 precisely controls the main rotating body III-6 to horizontally rotate, the drive motor III-15 precisely controls the main arm III-20 to swing up and down, the drive motor III-24 precisely controls the middle arm III-31 to swing up and down, the end joint drive motor III-37 precisely controls the end joint III-39 to swing up and down, and the front end small motor III-41 precisely controls the pressure plate III-43 to horizontally rotate. An angle λ, at which the turntable drive motor III-13 rotates the main rotating body III-6 may be transmitted through a signal to control the front end small motor III-41 to rotate an angle −λ of the pressure plate III-43. When the mechanical arm swings left and right horizontally, the pressure plate III-43 and the aluminum alloy honeycomb plate V always maintain at "forward positions". The drive motor III-24 and the end joint drive motor III-37 cooperate with each other, to ensure that the pressure plate III-43 is always parallel to a main positioning surface of the aluminum alloy honeycomb plate V. A working range of the mechanical arm may be obtained through cooperation between the turntable drive motor III-13 and the drive motor III-15 as well as the drive motor III-24. I a maximum working range, the stepped shaft III-2 welded in the turntable III-1 is used as a circle center, a farthest distance that the main arm III-20 and the middle arm III-31 can extend is a radius, and a drawn circular region is a working range of a single mechanical arm III. By controlling the drive motor III-15, the drive motor III-24, and the end joint drive motor III-37 to cooperate with each other, pressing work is implemented within the maximum working range of the mechanical arm.

Figure 14:
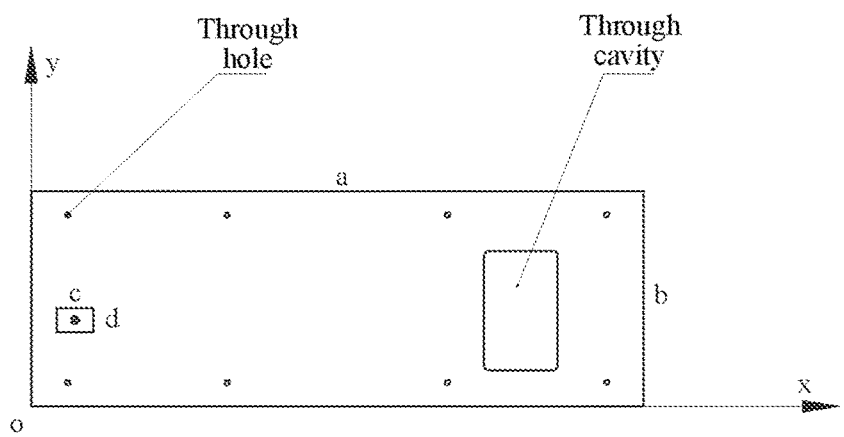
FIG. 14 is a view of the pressure plate and a workpiece in xoy plane coordinates in Embodiment 1 of the present invention.

How the parts of the machine tool fixture clamping apparatus III implement the movement of the mechanism is described above by using the mechanical structure. FIG. 14 is a view of the pressure plate III-43 and a workpiece in xoy plane coordinates. As shown in the figure, a long side of the pressure plate III-43 is c, and a wide side is d. A long side of the aluminum alloy honeycomb plate V is a, and a wide side is b. When the long side c of the pressure plate III-43 is parallel to the long side a of the aluminum alloy honeycomb plate V, it is regarded that the pressure plate III-43 is at a "forward position".

Figure 15:
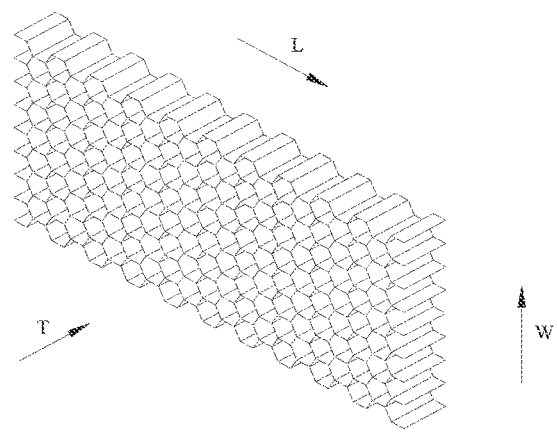
FIG. 15 is a structural diagram of a honeycomb core in Embodiment 1 of the present invention.

FIG. 15 is a structural diagram of a honeycomb core. As shown in the figure, due to the particularity of a honeycomb structure, the honeycomb core may be divided in three directions: a T direction, which is a direction perpendicular to a honeycomb thin wall, an L direction, which is a direction parallel to the honeycomb thin wall, and a W direction, which is a direction in which the honeycomb core stretches and extends. Rigidities in the L direction and the W direction are very weak, and a load of the aluminum alloy honeycomb plate that can be borne in the T direction is much greater than that in the L direction and the W direction. Therefore, the upper and lower aluminum plates of the aluminum alloy honeycomb plate are laid at upper and lower surfaces in the T direction of the honeycomb core respectively.

Figure 16:
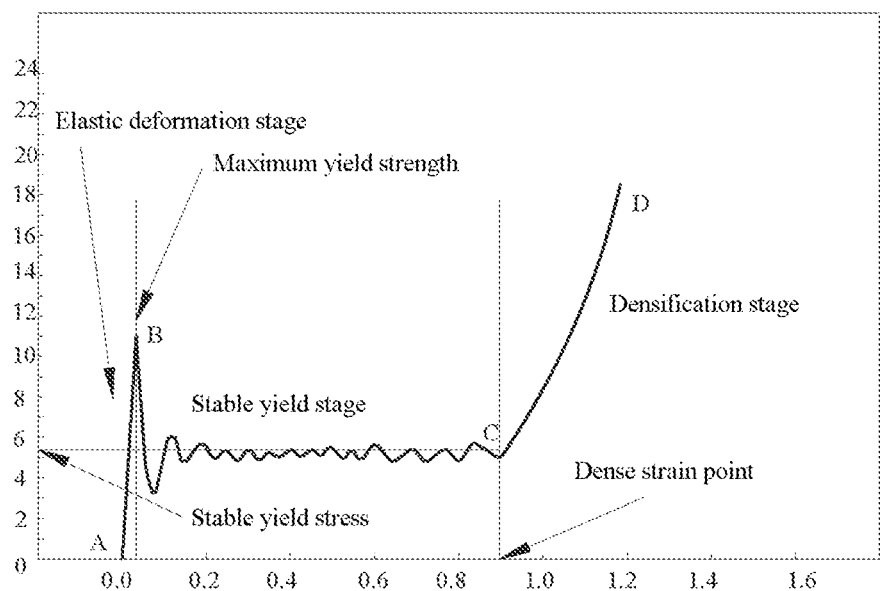
FIG. 16 is a typical schematic stress-strain diagram of compression of an aluminum honeycomb core in Embodiment 1 of the present invention.

Considering a weak rigidity in the L direction and the W direction of the honeycomb core, the pressure plate III-43 can apply a pressure to only V in the T direction. However, if the pressing force is excessively large, the honeycomb core is also plastically deformed to collapse. Therefore, it needs to ensure that the pressing force applied by the machine tool fixture clamping apparatus III is within a proper range, to implement reliable and effective pressing while ensuring that the honeycomb core is not plastically deformed. FIG. 16 is a typical schematic stress-strain diagram of compression of an aluminum honeycomb core.

It is obtained by analyzing a stress-strain of compression of an aluminum honeycomb as follows:

1. Elastic deformation stage (AB section): In this stage, a honeycomb wall is equivalent to that an elastic rod is under an action of forward compression, a stress and a strain have a linear relationship, and after being unloaded, the aluminum honeycomb can be restored to an original shape. The rule of deformation at this stage is the same as that of elastic deformation of a solid material. However, a point corresponds to yield strength of the aluminum honeycomb, and a value of the point may be calculated by using Formula (1):

$$\frac{\sigma_e}{E_s} = \frac{k}{1-v^2}\left(\frac{t}{b}\right)^3 \frac{1+4b/l}{\cos\theta(l/b+\sin\theta)} \qquad (1)$$

where $E_s$ is an elastic modulus of an aluminum honeycomb basis material; k is a constraint factor of an end surface of a honeycomb cell; t is a wall thickness of the honeycomb cell, that is, a thickness of the aluminum honeycomb basis material; b is a side length of a cell with a wall thickness of t; l is a side length of a cell with a wall thickness of 2t; v is a Poisson ratio of the aluminum honeycomb basis material; and θ is an acute angle between adjacent honeycomb cells. For a regular hexagonal honeycomb, k=5.73.

2. Stable yield stage (BC section): As the stress increases, an aluminum honeycomb wall loses stability, and is yielded and folded, and this process is repeated continuously. As a result, the stress in this interval appears to continuously oscillate in a specific interval instead of being always stable and increasing or decreasing in one direction. A yield plateau stress of an important parameter of a static compression mechanical behavior of the aluminum honeycomb is generally an average stress at this stage of compression of the aluminum honeycomb. The yield plateau stress of the honeycomb of a hexagonal pin at this stage may be obtained by using Formula (2):

$$\sigma_p = 6.6\left(\frac{t}{b}\right)^{5/3}\sigma_s \qquad (2)$$

where $\sigma_s$ is the yield strength of the aluminum honeycomb basis material.

3. Densification stage (CD section): After the yield plateau stage is completed, all the honeycomb cells are folded. In this case, a gap between the honeycomb walls is relatively small, and the stress needs to be greatly increased for continuously compressing strains having a relatively small gap. The stage continues until the aluminum honeycomb is completely densified.

It can be learned according to the analysis of a stress-strain compression curve of the honeycomb core that a compressive stress applied by the pressure plate III-23 in the T direction of the honeycomb should be in the AB stage, so that it can be ensured that the applied pressure does not cause the honeycomb core to be yielded and deformed, and after the fixture releases, the honeycomb core may be restored to an original shape. It can be learned from the typical schematic stress-strain diagram of the compression of the aluminum honeycomb that in a direction of the pressing force, it is ensured that a maximum stress applied by the pressure plate III-23 is less than a maximum linear elastic stress (that is, the yield strength).

Assuming that an area of the pressure plate acting on the honeycomb surface is A, and the clamping force of the pressure plate is $F_Y$, a formula for the maximum compressive stress that the pressure plate may apply may be obtained:

$$\sigma_Y = \frac{F_Y}{A} \le \sigma_e = \frac{E_s k}{1-v^2} \left(\frac{t}{b}\right)^3 \frac{1+4b/l}{\cos\theta(l/b+\sin\theta)} \quad (3)$$

where $\sigma_Y$ is a magnitude of the stress applied by the pressure plate.

It can be learned according to the foregoing Formula (3) that when a honeycomb size parameter such as a thickness of the honeycomb cell wall of the honeycomb core or a side length of the honeycomb cell changes, the mechanical arm may pre-input a new parameter of the honeycomb core according to a set program, and recalculate a proper application range of the pressing force according to the formula. The operation is as follows: A surface pressure sensor III-44 is mounted inside the pressure plate III-43. When the pressure plate III-43 starts to act on the aluminum alloy honeycomb plate V, the surface pressure sensor III-44 starts to work, transmits a signal to a computer, displays in real time a value of pressure applied by the pressure plate III-43, controls the mechanical arm by using a computer control system, and ensures that a value of a stress caused by the pressure of the pressure plate is always within a maximum stress range that the honeycomb core can bear.

Because a height of the honeycomb core is generally tens of millimeters, a strain in the AB section is very small, and a product of the height of the honeycomb core and the strain in the AB section is an amount of elastic deformation of the height of the honeycomb core. Therefore, whether to consider an error caused by the amount of elastic deformation needs to be determined according to precision of the machining workpiece. If the error caused by the amount of elastic deformation needs to be considered due to a requirement of the machining precision, error compensation needs to be performed; and if the required machining precision can be met, no error compensation is needed.

Figure 17:
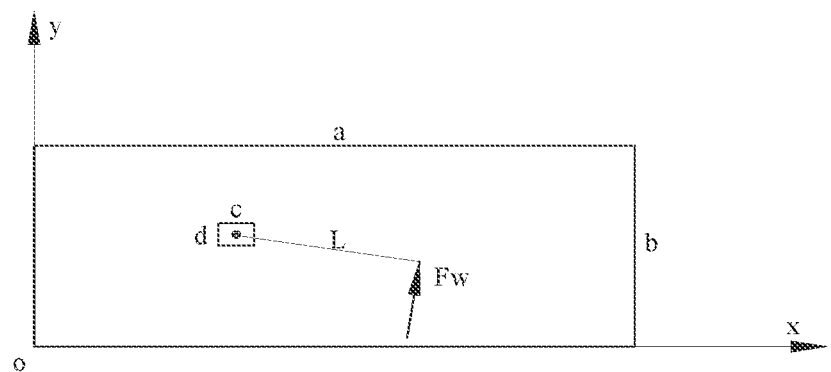
FIG. 17 is a schematic diagram of a torque formed by a milling force in Embodiment 1 of the present invention.

Theoretical analysis on that the honeycomb surface may be damaged due to an excessive large pressing force, and is plastically deformed has been made above, and a maximum value of the pressing force that can be applied is determined. Then, an application range of the pressing force of the pressure plate III-43 needs to be considered to be as close as possible to a cutting machining position to make the pressure plate tightly fixed and reliable. FIG. 17 is a schematic diagram of a torque formed by a milling force on the aluminum alloy honeycomb plate V. To prevent the aluminum alloy honeycomb plate V from having unreliable positioning due to an excessively large torque during machining, and prevent the machining precision of the workpiece from being affected by position deflection, the pressure plate needs to apply a sufficient pressing force to offset the torque. It can be learned from FIG. 18 that a counterclockwise torque M formed at the pressure plate III-43 can resist a clockwise torque when the pressure plate deflects. The theoretical analysis is as follows:

First, it needs to learn a milling force when the milling cutter mills the honeycomb workpiece at a high speed.

A formula for calculating a plane milling force of the honeycomb core is as follows:

It is assumed that a coordinate system of the workpiece is Xw–Yw, R a cutting tool radius, ω is a cutting speed, and a cutting tool machining locus function is $f(x)$;

a cutting tool center may be represented as (x(t), $f(x)$);
a coordinate system of a cutting tip is (x(t)+R sin wt, $f(x)$+R cos wt);

each honeycomb wall may be described by using a linear function: $y = a^i x + b^i$, where i represents an $i^{th}$ honeycomb wall in a cutting region, a is 0 or 1.732 or −1.732, and b depends on a position of a cell wall; and coordinates of x at a starting point of an $i^{th}$ cell wall are considered to be $x_o^i$, and coordinates of an end point may be calculated as $$x_0^i + \frac{l}{\sqrt{1+a^2}},$$

where l is a length of the cell wall.

A constraint equation that the cutting tool and a honeycomb unit need to meet is:

$$\begin{cases} R\cos wt - a^i \cdot R\sin wt = a^i x(t) + b^i - f(x) \\ x_0^i \le x(t) + R\sin wt \le x_0^i + \frac{l}{\sqrt{1+a^2}} \end{cases} \quad (4)$$

A condition function $H_1(x)$ is:

$$H_1(x) = \begin{cases} 1, & ax+b > f(x) \\ -1 & ax+b < f(x) \end{cases} \quad (5)$$

In this case, R cos wt may be calculated as follows:

$$R\cos wt = H_1(x)\sqrt{R^2-(x_0^i-x)^2} \quad (6)$$

R cos wt is substituted into the constraint equation, and a time t during which the cell wall is in a cutting state may be obtained by using the following formula:

$$f(x(t))+H_1(x)\sqrt{R^2-(x_0^i-x(t))^2}-a^i x(t)-b^i=0 \quad (7)$$

In addition, a formula for calculating an inlet angle of the $i^{th}$ honeycomb cell wall cut at any time is:

$$\theta^i(t) = \tan^{-1}a^i - \tan^{-1}\left(\frac{a^i x_0^i + b^i - f(x(t))}{x_0^i - x(t)}\right) + \frac{\pi}{2} \quad (8)$$

An azimuth angle γ of each honeycomb cell wall is defined as an angle between the cell wall and Xw. Therefore, two components of forces in Xw and Yw directions may be derived from the following formula:

$$\begin{cases} F_{Yw}^i = -F_{yh}^i \cos\gamma^i - F_{xh}^i \sin\gamma^i \\ F_{Xw}^i = F_{yh}^i \sin\gamma^i - F_{xh}^i \cos\gamma^i \end{cases} \quad (9)$$

A second condition function $H_2(x)$ is:

$$H_2(x) = \begin{cases} 1, & t \in [t_1^i, t_2^i] \\ 0, & t \notin [t_1^i, t_2^i] \end{cases} \quad (10)$$

A total cutting force for milling the honeycomb core is obtained as follows:

$$\begin{cases} F_{Yw} = \sum_i H2(x) \cdot F_{Yw}^i \\ F_{Xw} = \sum_i H2(x) \cdot F_{Xw}^i \end{cases} \quad (11)$$

The theoretical analysis of a resisting torque formed by the pressure plate III-43 on the workpiece is as follows:

It is known that the milling forces on the honeycomb core in X and Y directions are $F_{Yw}$, $F_{Xw}$ and a pressing force $F_Y$ of the pressure plate. Assuming that a linear distance between an entrance position at which the milling cutter starts to cut the workpiece and a center position at which the pressure plate applies a pressure is L, the milling force for milling the honeycomb plate produces a torque effect on the workpiece, that is, $F_w \cdot L$, where $F_w$ is a sum of the milling forces of the honeycomb core and the honeycomb plate. To avoid that the position of the workpiece changes during machining and ensure reliable positioning, it needs to make a torque formed by a friction force $F_f$ formed at the pressure plate III-43 be capable of offsetting the torque of the milling force. That is:

$$F_f = F_Y \cdot \mu = qA \cdot \mu \quad (12)$$

$$f = q \cdot \mu \quad (13)$$

where q is a single pressure applied by each point of the pressure plate to the workpiece; and $f$ is a single static friction force formed by the single pressure.

Figure 18:
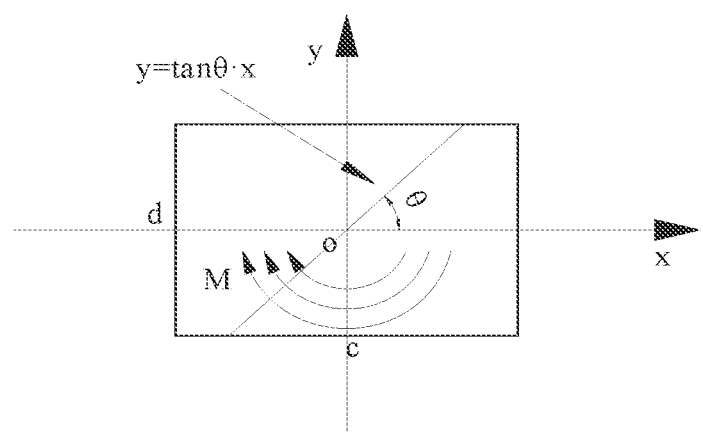
FIG. 18 is a schematic diagram of a resisting torque within an application range of the pressure plate in Embodiment 1 of the present invention.

As shown in FIG. 18, the resisting torque formed by the pressure plate III-43 is:

$$8 \int_0^{\arctan\frac{d}{c}} \int_0^{\frac{c}{2}} q \cdot \mu \cdot \frac{x}{\cos\theta} dx d\theta \geq F_w \cdot L \quad (14)$$

where $F_w$ is the milling force, and L is a distance from the milling force to a rotation center.

Because the pressure plate III-43 is required to be as close to the cutting region as possible, a largest distance L herein is $\sqrt{c^2+d^2}$. Due to the known milling force, a minimum pressing force that the pressure plate III-43 can apply may be calculated according to double integral. Then, according to the foregoing formula (3), to avoid a maximum pressing force that can be applied by plastic deformation of the honeycomb core, the application range of the pressing force of the pressure plate III-43 may be obtained.

Figure 19:
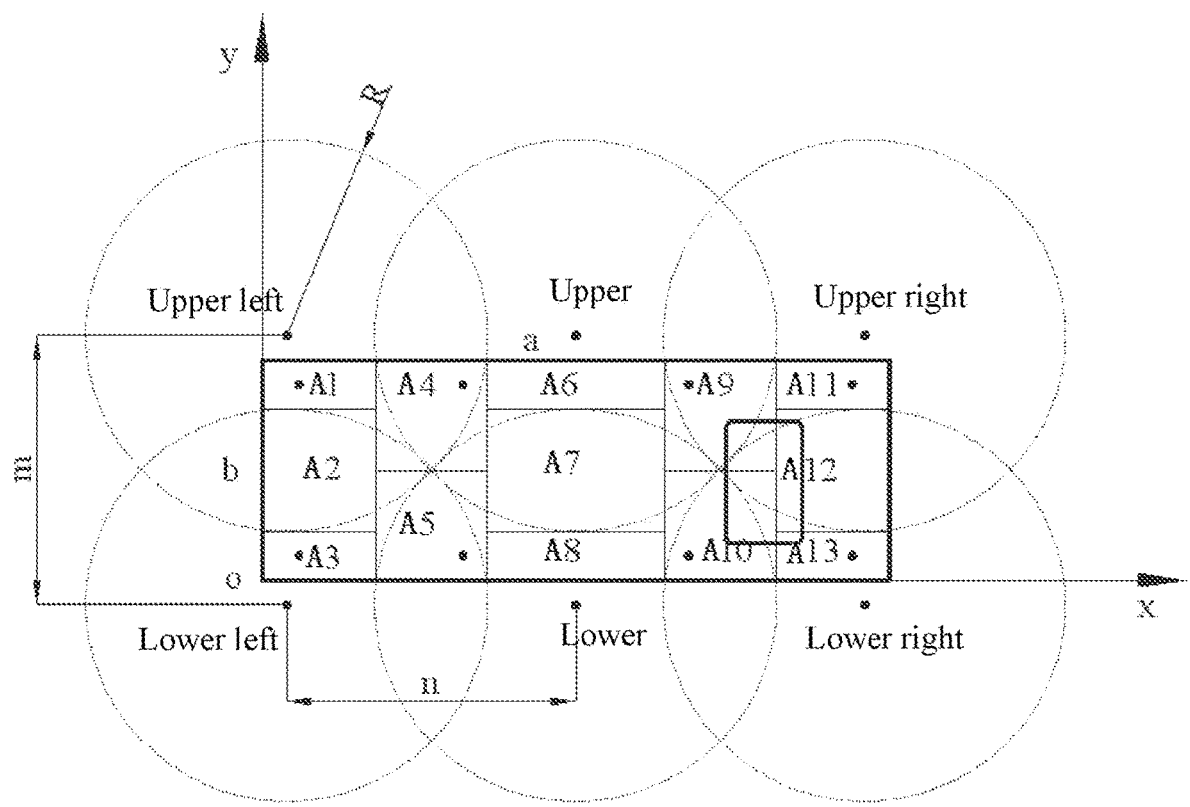
FIG. 19 is a schematic diagram of a position distribution and a working region division of the mechanical arm in Embodiment 1 of the present invention.

For a linkage working method of the machine tool fixture clamping apparatus III formed by six mechanical arms and a machine tool cutting path, according to positions of the mechanical arms and the position of the workpiece, an X-axis and Y-axis coordinate system is established, the working range of the mechanical arm is clearly divided in a workpiece coordinate system, and each region obtained through division works through cooperation between the mechanical arms. As regions passed during machine tool cutting are different, in a reached different region, a mechanical arm is responsible for the region for cooperation and clamping. As shown in FIG. 19, description needs to be made from the following three aspects.

First, in determining the position and layout of the mechanical arms, it is necessary to ensure that the maximum working range of the four adjacent mechanical arms that can form a rectangle has a common coverage. That is, four circles with a radius of R in the figure have a common intersection. The machining of any point on the workpiece can be covered only after the intersection is ensured. However, if the intersection is excessively large, a problem of mutual interference between the mechanical arms III occurs. To ensure that there is an intersection and no interference problem occurs, a geometric relationship in the figure may be obtained:

$$\begin{cases} \sqrt{\left(\frac{m}{2}\right)^2 + \left(\frac{n}{2}\right)^2} \geq R \\ b < m < 2R \end{cases} \quad (15)$$

According to the foregoing formula, a range of n may be calculated, and after the arrangement positions of the mechanical arms are obtained, the mechanical arms are separately mounted in the proper positions. As shown in the figure, the positions of the mechanical arms have been distributed according to the size of the workpiece, and the positions of the six mechanical arms in the figure are named "upper left", "lower left", "upper", "lower", "upper right", and "lower right" respectively. "Upper left", "upper", and "upper right" are equidistantly distributed along an x-axis direction, "lower left", "lower" and "lower right" are equidistantly distributed along the x-axis direction, "upper left" and "lower left" are equally divided on two sides of a long side of the workpiece V along a y axis at a distance of m, "upper" and "lower" are equally divided on two sides of the long side of the workpiece V along the y axis at the distance of m, and "upper right" and "lower right" are equally divided on two sides of the long side of the workpiece V along the y axis at the distance of m.

Second, an aspect of programming a numerical control machine tool. The numerical control machine tool has a machine tool origin, a reference point, a working origin, and a cutter calibration point. The machine tool origin is an origin of a machine tool coordinate system, and is a datum point of another coordinate system such as the workpiece coordinate system or a programming coordinate system, and the machine tool reference point. The numerical control machine tool implements a plan of the cutting path during machining in a manner of programming coordinates. The programming coordinate system is a coordinate system established by a programmer according to a component pattern, a machining technology, and the like. The programmer uses a specific point of the workpiece as an origin of the workpiece coordinate system, and this point is used as the working origin. The cutter calibration point is a starting point at which a cutting tool moves relative to the workpiece during machining of the numerical control machine tool, and the program starts from this point. In FIG. 19, a point o is a vertex of a lower left corner of the workpiece V, the point o is used as the cutter calibration point and the working origin, and an xoy workpiece coordinate system is established.

Third, an aspect of dividing the working region of the mechanical arm. After the point o is determined as the working origin, and the workpiece coordinate system is established, a machining path of the workpiece V is programmed according to a machining technology process required by the workpiece V. A working range of each mechanical arm is a circle with a radius of R. It can be learned according to arrangement positions of the mechanical arms that there is a common working range between every two mechanical arms, and the common working range between every two mechanical arms is made to lines parallel to the x axis and parallel to the y axis in the workpiece coordinate system, to divide the working range into 13 working regions. After the working region is divided, each corresponding region has a specific coordinate region in the workpiece coordinate system. A cooperation relationship between the mechanical arms of the six positions is then programmed. The program is enabled to follow as follows: When the milling cutter performs milling machining in a region A1, the "upper left" mechanical arm dodges, and the "lower left" and "upper" mechanical arms jointly implement pressing on the region A1; when the milling cutter performs milling machining in a region A2, the "upper left" and "lower left" mechanical arms jointly implement pressing on the region A2; when the milling cutter performs milling machining in a region A3, the "lower left" mechanical arm dodges, and the "upper left" and "lower" mechanical arms jointly implement pressing on the region A3; when the milling cutter performs milling machining in a region A4, the "upper left" and "upper" mechanical arms jointly implement pressing on the region A4; when the milling cutter performs milling machining in a region A5, the "lower left" and "lower" mechanical arms jointly implement pressing on the region A5; when the milling cutter performs milling machining in a region A6, the "lower" mechanical arm implements pressing on the region A6; when the milling cutter performs milling machining in a region A7, the "upper" and "lower" mechanical arms jointly implement pressing on the region A7; when the milling cutter performs milling machining in a region A8, the "upper" mechanical arm implements pressing on the region A8; when the milling cutter performs milling machining in a region A10, the "lower right" and "lower" mechanical arms jointly implement pressing on the region A10; when the milling cutter performs milling machining in a region A11, the "upper right" mechanical arm dodges, and the "lower right" and "upper" mechanical arms jointly implement pressing on the region A11; when the milling cutter performs milling machining in a region A12, the "upper right" and "lower right" mechanical arms jointly implement pressing on the region A12; and when the milling cutter performs milling machining in a region A13, the "lower right" mechanical arm dodges, and the "upper right" and "lower" mechanical arms jointly implement pressing on the region A13. In the 13 regions, the regions A2, A4, A5, A7, A9, A10, or A12 is a common intersection region between every two mechanical arms. Therefore, it is implemented only through cooperation between the two corresponding mechanical arms that have an intersection. The region A1, A3, A6, A8, A11, or A13 is a range covered by a single mechanical arm. However, considering a case that the single mechanical arm in this region may interfere with the machine tool spindle, the mechanical arm in this region is selected to dodge, and an adjacent mechanical arm is responsible for pressing.

Figure 20:
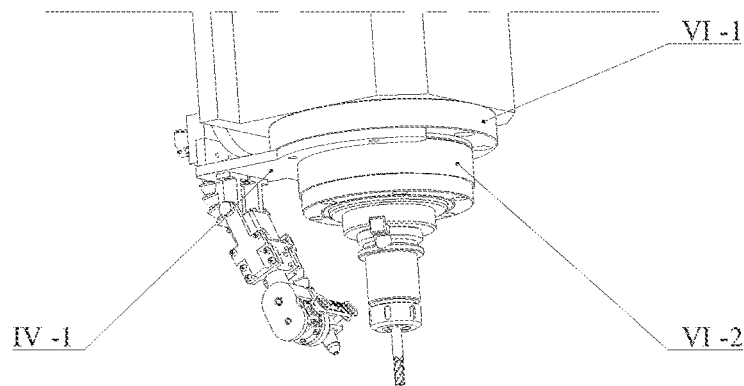
FIG. 20 is a schematic diagram of a machine tool spindle in Embodiment 1 of the present invention.
Figure 21:
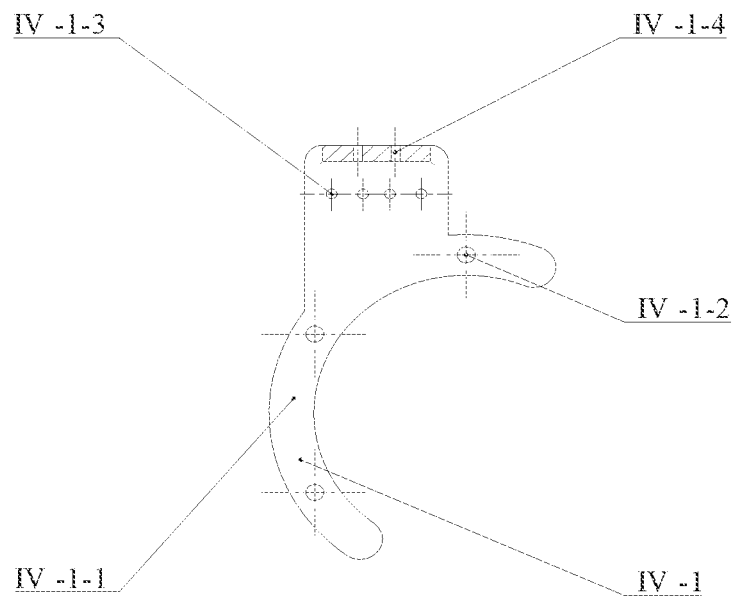
FIG. 21 a partial cross-sectional view of a spindle connecting member in Embodiment 1 of the present invention.
Figure 22:
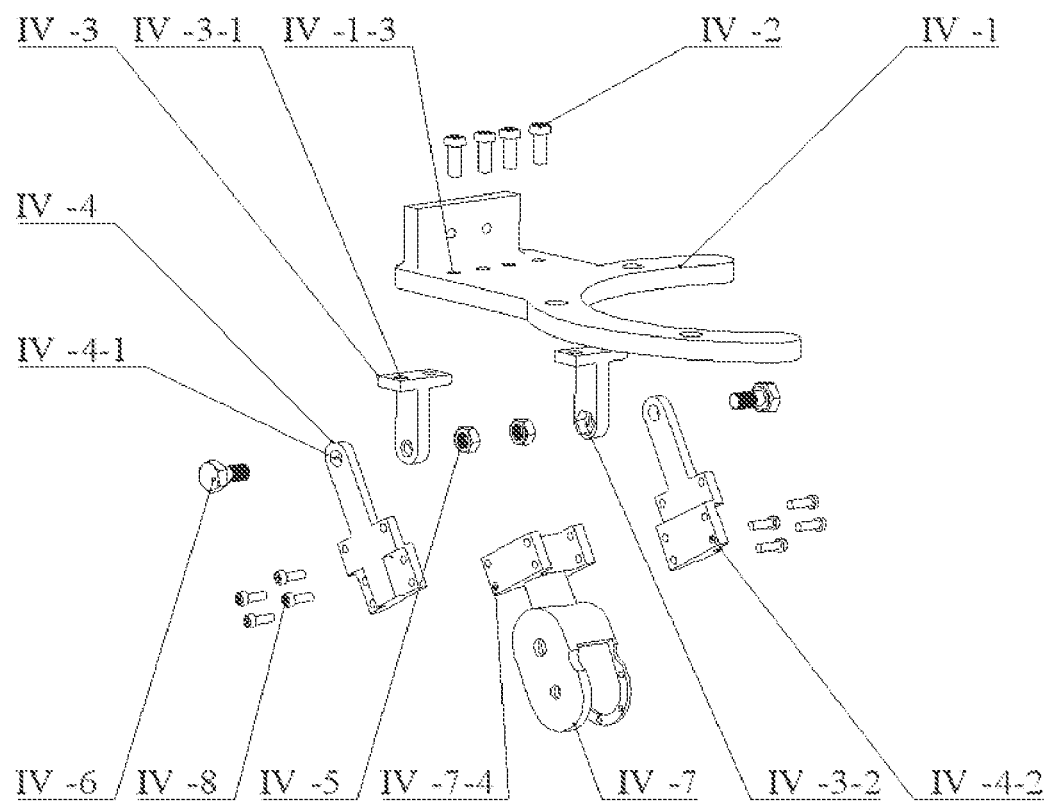
FIG. 22 is a schematic diagram of cooperation between the spindle connecting member and a high elevation rod in Embodiment 1 of the present invention.

As shown in FIG. 20 to FIG. 22, the machine tool spindle VI is connected to the minimum quantity lubrication spray angle control apparatus IV by a spindle connecting member IV-1, and the nozzle extends to a milling cutter at a bottom of the machine tool spindle. An inner diameter of an arc structure IV-1-1 in the spindle connecting member IV-1 co-axially fits with an outer diameter of a front cover VI-2 of the machine tool spindle VI, and the arc structure IV-1-1 of the spindle connecting member IV-1 is provided with three threaded holes IV-1-2, which are used for mounting the spindle connecting member IV-1 on a sleeve VI-1 of the machine tool spindle VI. The spindle connecting member IV-1 is provided with through holes IV-1-3, which are fixedly connected to threaded holes IV-3-1 at end portions of two hinged supports IV-3 by cross recessed screws IV-2. An end portion of the other end of the hinged support IV-3 is provided with a hexagonal groove IV-3-2, a hexagonal fastening nut IV-5 is disposed in the hexagonal groove IV-3-2, and an angle fastening bolt IV-6 is connected to a through hole IV-4-1 at an end of the high elevation rod IV-4 and an end of the hinged support IV-3, and then fits with the hexagonal fastening nut IV-5 embedded in the hinged support IV-3. When a high elevation is determined, an angle between the hinged support IV-3 and the high elevation rod IV-4 is adjusted, and the angle fastening bolt IV-6 is screwed to fix the high elevation of the minimum quantity lubrication spray angle control apparatus IV. The cross recessed screw IV-8 is connected to a through hole IV-4-2 at the other end of the high elevation rod IV-4 and a threaded hole IV-7-4 of a housing IV-7.

Figure 23:
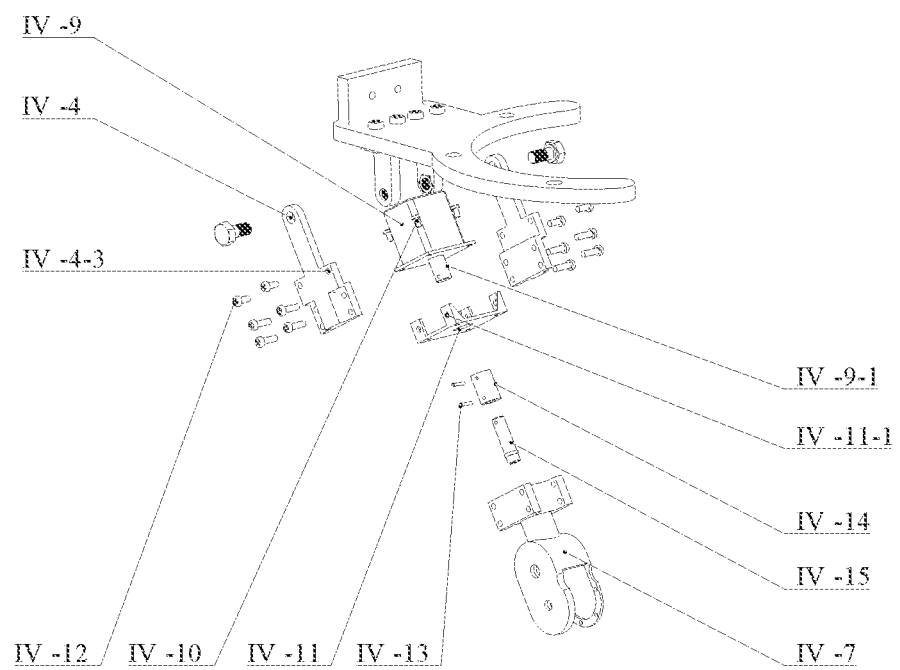
FIG. 23 is a schematic diagram of cooperation among the high elevation rod, a housing, and the like in Embodiment 1 of the present invention.
Figure 24:
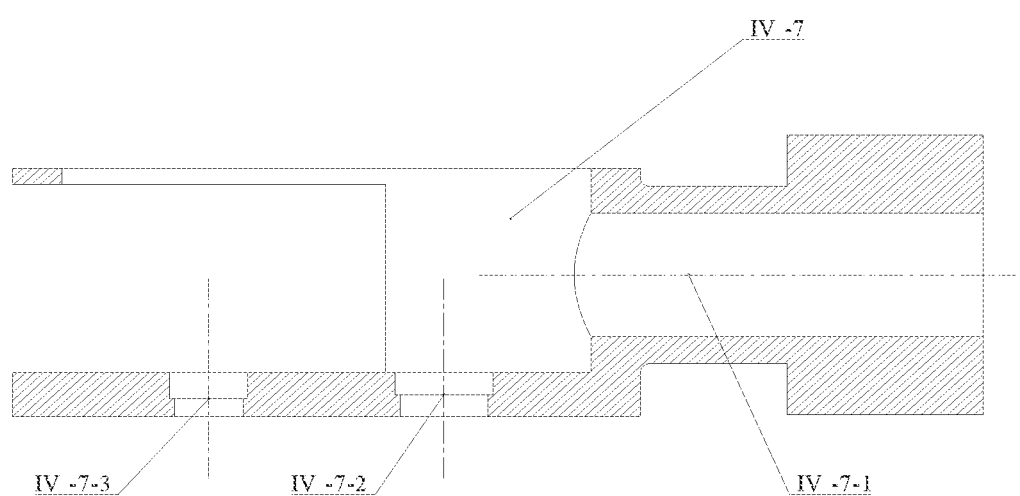
FIG. 24 is a cross-sectional view of the housing in Embodiment 1 of the present invention.
Figure 25:
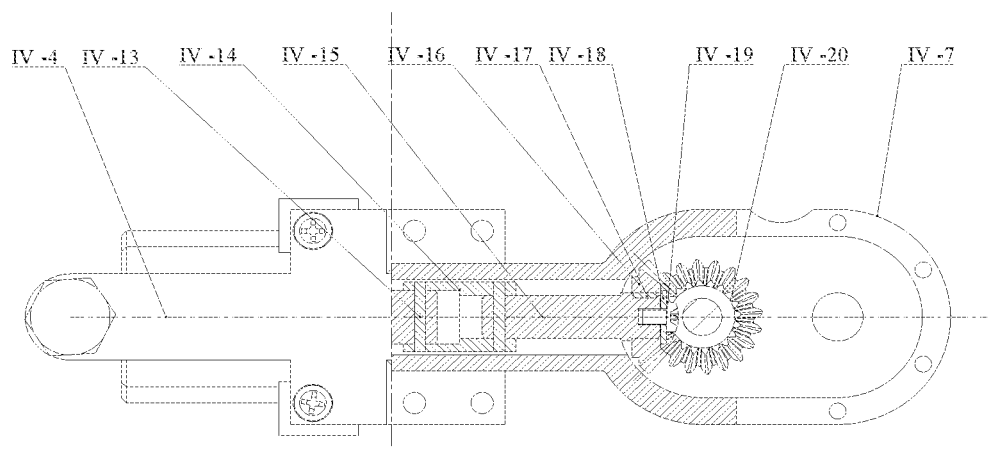
FIG. 25 a partial cross-sectional view of a low elevation mechanism in Embodiment 1 of the present invention.
Figure 26:
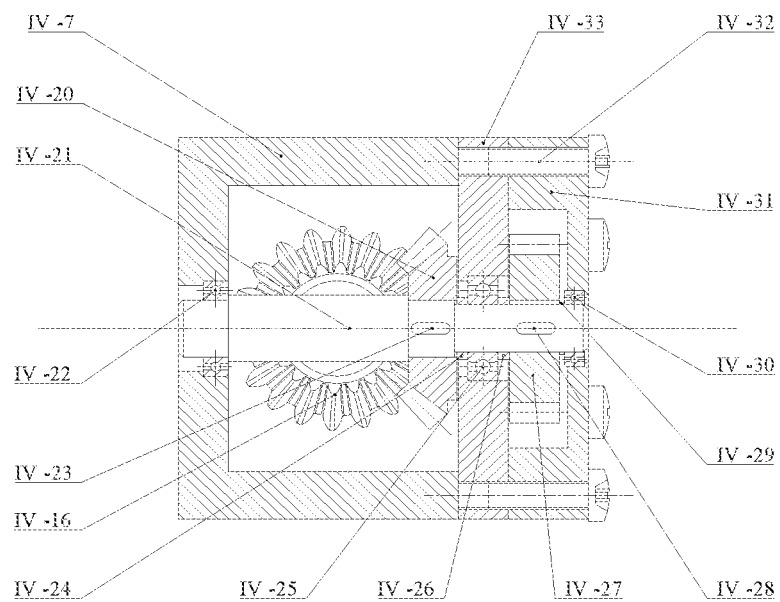
FIG. 26 is a cross-sectional view of the low elevation mechanism in Embodiment 1 of the present invention.
Figure 27:
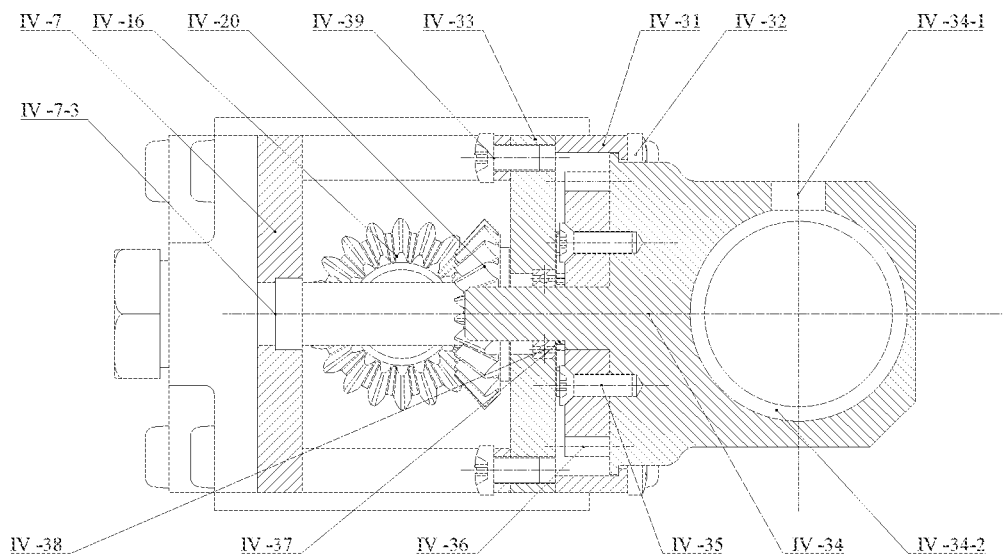
FIG. 27 is another cross-sectional view of the low elevation mechanism in Embodiment 1 of the present invention.
Figure 28:
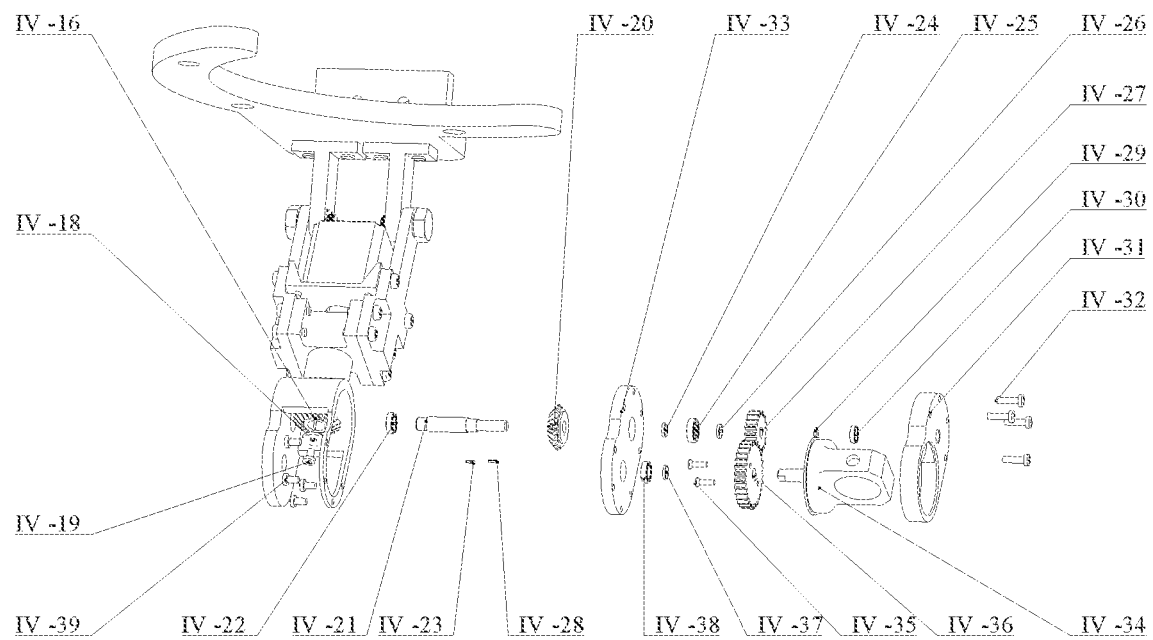
FIG. 28 is a schematic diagram of cooperation among the low elevation mechanism, the high elevation rod, and the like in Embodiment 1 of the present invention.

As shown in FIG. 23, a servo motor IV-9 is fixedly connected to a motor support IV-11 by a cross recessed pan head screw IV-10. A motor shaft IV-9-1 of the servo motor IV-9 and a shaft IV-15 are separately in interference fit with a coupling sleeve IV-14, two pins IV-13 are inserted to fix axial positions of the two shafts, and a torque of the motor shaft IV-9-1 is transmitted to the shaft IV-15. The shaft IV-15 is then inserted into a through hole IV-7-1 of the housing IV-7, and the cross recessed screw IV-12 is connected to a through hole IV-4-3 of the high elevation rod IV-4 and a threaded hole IV-11-1 of the motor bracket IV-11, to fix a position of the servo motor IV-9. The high elevation rod, the housing, and the like form a high elevation mechanism.

As shown in FIG. 25 to FIG. 28, the low elevation mechanism includes a bevel gear IV-16, a round end key IV-17, a baffle plate IV-18, a screw IV-19, a bevel gear IV-20, a shaft IV-21, a deep groove ball bearing IV-22, a round end key IV-23, a sleeve IV-24, a deep groove ball bearing IV-25, a sleeve IV-26, a straight gear IV-27, a round end key IV-28, a sleeve IV-29, a deep groove ball bearing IV-30, an end housing IV-31, a cross recessed pan head screw IV-32, a middle plate IV-33, a low elevation rotating member IV-34, a countersunk screw IV-35, a straight gear IV-36, a sleeve IV-37, a deep groove ball bearing IV-38, and a pan head screw IV-39. The bevel gear IV-16 is mounted on the shaft IV-15, and the shaft IV-15 is provided with a shaft ring used for determining an axial position of the bevel gear IV-16. The shaft IV-15 transmits a torque to the bevel gear IV-16 by using the round end key IV-17. A shaft end baffle plate IV-18 is mounted on a right side of the bevel gear IV-16, and is used for fixing the axial position of the bevel gear IV-16, and the baffle plate IV-18 is fixed on the shaft IV-15 by using the screw IV-19. The bevel gear IV-16 perpendicularly fits with an axial space of the bevel gear IV-20 to change a direction of the torque. It is learned according to FIG. 26 that a shaft shoulder is disposed at a left end of the shaft IV-21, the deep groove ball bearing IV-22 is mounted on a left side of the shaft shoulder, an outer ring of the deep groove ball bearing IV-22 is in interference fit with a stepped inner hole IV-7-2 of the housing IV-7 by using the basic shaft system, and an inner ring of the deep groove ball bearing IV-22 is in interference fit with the shaft IV-21 by using the basic hole system. The shaft IV-21 is provided with a key groove, the round end key IV-23 is mounted in the key groove, and an inner groove of the bevel gear IV-20 is in interference fit with the round end key IV-23. When rotating, the bevel gear IV-16 drives the bevel gear IV-20 to rotate, and the bevel gear IV-20 drives, by using the round end key IV-23, the shaft IV-21 to rotate. The sleeve IV-24 is mounted on a right side of the bevel gear IV-20, and an inner diameter of the sleeve IV-24 is in clearance fit with an outer diameter of the shaft IV-21. The deep groove ball bearing IV-25 is mounted on a right side of a sleeve IV-24, an outer ring of the deep groove ball bearing IV-25 is in interference fit with a stepped inner hole of the middle plate IV-33 by using the basic shaft system, and an inner ring of the deep groove ball bearing IV-22 is in interference fit with the shaft IV-21 by using the basic hole system. The sleeve IV-26 is mounted on a right side of the deep groove ball bearing IV-22 to determine a position of the bearing. A round end key IV-28 is disposed on another key groove on the shaft IV-21, and the round end key IV-28 is in interference fit with an inner groove of the straight gear IV-27. When rotating, the shaft IV-21 drives the straight gear IV-27 to rotate. The sleeve IV-26 is disposed on a left side of the straight gear IV-27, the sleeve IV-29 is disposed on a right side, and both are used for preventing axial movement of the straight gear IV-27. The deep groove ball bearing IV-30 is disposed on a right side of the sleeve IV-29, an outer ring of the deep groove ball bearing IV-30 is in interference fit with a stepped inner hole of the end housing IV-31 by using the basic shaft system, and an inner ring of the deep groove ball bearing IV-30 is in interference fit with the shaft IV-21 by using the basic hole system. The end housing IV-31 and the middle plate IV-33 are connected and fixed by the cross recessed pan head screw IV-32. The low elevation rotating member IV-34 is fixedly connected to the straight gear IV-36 by the countersunk screw IV-35. The low elevation rotating member IV-34 is assembled to the end housing IV-31 from left to right. The straight gear IV-36 is equipped with the sleeve IV-37, and the deep groove ball bearing IV-38 is disposed on a left side of the sleeve IV-37. The straight gear IV-36, the sleeve IV-37, and the deep groove ball bearing IV-38 are all assembled on a left end shaft of the low elevation rotating member IV-34, and are then mounted in a through hole of the middle plate IV-33. The pan head screw IV-39 is used for connecting and fixing the housing IV-7 and the middle plate IV-33.

Figure 29:
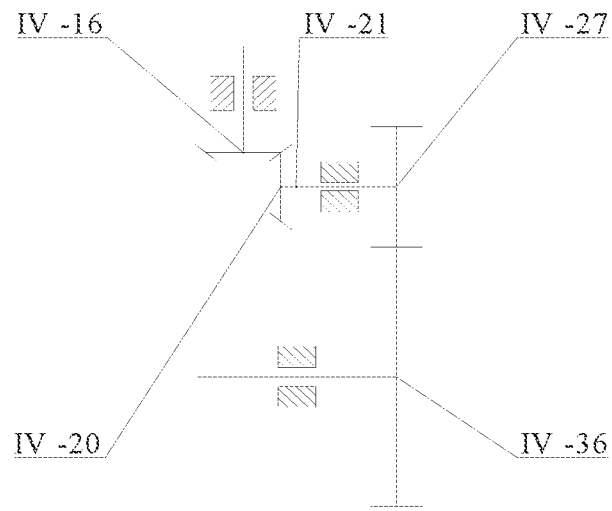
FIG. 29 is a brief diagram of a gear train in Embodiment 1 of the present invention.

FIG. 29 is a brief diagram of a gear train formed by the foregoing gears. When rotating, the bevel gear IV-16 drives the bevel gear IV-20 to rotate, the bevel gear IV-20 transmits a torque to the shaft IV-21, the shaft IV-21 then transmits the torque to the straight gear IV-27, and drives the straight gear IV-27 to rotate, and the straight gear IV-27 drives the straight gear IV-36 to rotate, to implement angle adjustment of the low elevation mechanism.

Figure 30:
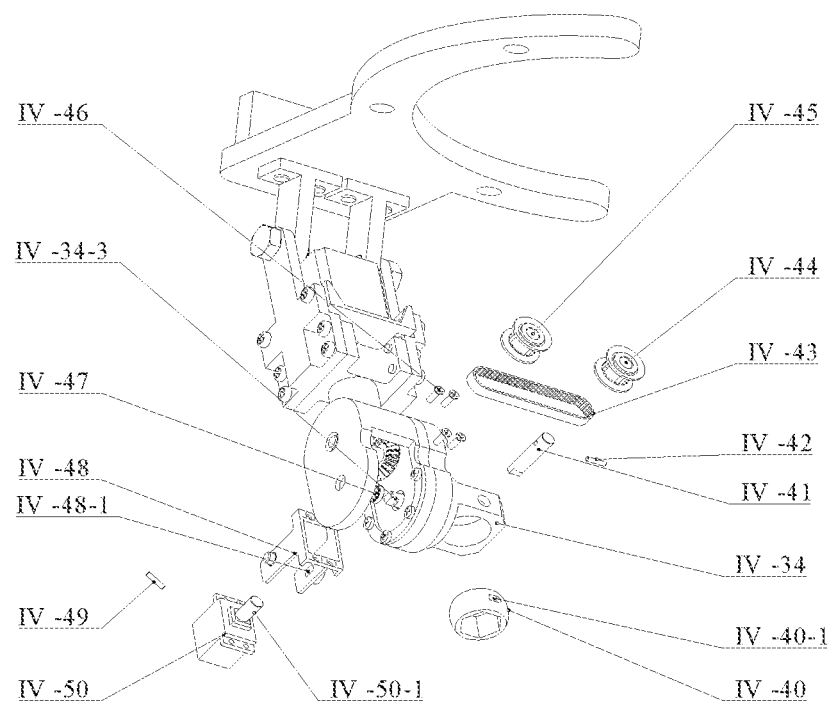
FIG. 30 is a schematic diagram of cooperation among a horizontal swing angle mechanism and the low elevation mechanism in Embodiment 1 of the present invention.

As shown in FIG. 30, the horizontal swing angle mechanism includes a ball joint rotating member IV-40, and the ball joint rotating member IV-40 fits with a spherical surface IV-34-2 within the low elevation rotating member IV-34. A shaft IV-41 is in clearance fit with a through hole IV-34-1 of the low elevation rotating member IV-34, and a flat structure of the shaft IV-41 is then in interference fit with a flat through hole IV-40-1 of the ball joint rotating member IV-40. A synchronous pulley IV-44 is fixedly connected to the shaft IV-41 by a synchronous pulley pin IV-42 and transmits a torque. A flat through hole IV-48-1 of a steering gear bracket IV-48 is in interference fit with a flat structure IV-34-3 of the low elevation rotating member IV-34. A deep groove ball bearing IV-47 is in interference fit with a stepped through hole IV-7-3 of the housing IV-7 by using the basic shaft system. A stepped shaft of the steering gear bracket IV-48 is in interference fit with an inner hole of the deep groove ball bearing IV-47 by using the basic hole system. When rotating, the straight gear IV-36 drives the low elevation rotating member IV-34 and the steering gear bracket IV-48 to rotate. A steering gear IV-50 is fixedly connected to the steering gear bracket IV-48 by a countersunk screw IV-46. A synchronous pulley IV-45 is fixedly connected to a steering gear shaft IV-50-1 of the steering gear IV-50 by a synchronous pulley pin IV-49 and transmits a torque. The synchronous pulley IV-44 and the synchronous pulley IV-45 are on a same plane in space and are connected by a synchronous belt IV-43. When the steering gear IV-50 drives the synchronous pulley IV-45 to rotate, the synchronous pulley IV-45 transmits a torque to the synchronous pulley IV-44 through the synchronous belt IV-43, the synchronous pulley IV-44 drives the shaft IV-41 to rotate, and the shaft IV-41 drives the ball joint rotating member IV-40 to rotate left and right.

Figure 31:
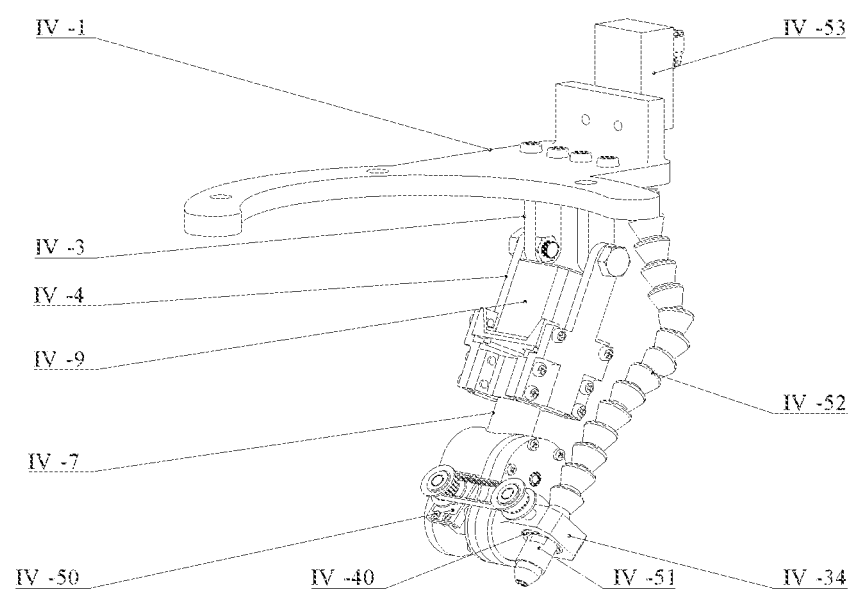
FIG. 31 is a final assembly diagram of a minimum quantity lubrication spray angle control apparatus in Embodiment 1 of the present invention.

FIG. 31 is a final assembly diagram of a minimum quantity lubrication spray angle control apparatus IV. As shown in the figure, the foregoing parts have been finally assembled, and a nozzle IV-51, a universal joint cooling pipe IV-52, and an atomizer IV-53 are further included. The nozzle IV-51 is fixed on the ball joint rotating member IV-40, the atomizer IV-53 is fixedly connected to a threaded hole IV-1-4 of the spindle connecting member IV-1, and the nozzle IV-51 and the atomizer IV-53 are connected by the universal joint cooling pipe IV-52.

A specific working mode of the minimum quantity lubrication spray angle control apparatus is as follows:

First, an airflow field distribution in a milling region may be determined due to parameters such as a shape and a size of the cutting tool, a milling manner, and a rotation speed of the milling cutter. When a position of a nozzle elevation is considered, because a micro-droplet may enter the milling region more easily under assistance of radial flow, it needs to select to spray atomization from a direction of the radial flow in an airflow field. Therefore, by adjusting the high elevation mechanism, that is, the angle between the hinged support IV-3 and the high elevation rod IV-4, and according to an angle of the radial flow in the airflow field, a proper angle α of the elevation may be determined, and the angle is within a range of the angle of the radial flow.

Then, the low elevation mechanism is adjusted. That is, the servo motor IV-9 transmits a torque by using the gear train, and controls the rotation of the low elevation rotating member IV-34, to finely adjust the elevation of the nozzle IV-51. Because the aluminum alloy honeycomb plate V includes the upper and lower plates, and is of an aluminum alloy honeycomb core structure in the middle, during vertical milling machining, with insertion of the milling cutter, the elevation of the nozzle IV-51 is finely adjusted properly, and the micro-droplet can be better sprayed into a thin wall surface of the middle aluminum alloy honeycomb core instead of being large-area rebounded on an upper aluminum plate surface. In this way, a better minimum quantity lubrication effect is achieved.

Finally, the horizontal swing angle mechanism is adjusted. That is, the steering gear IV-50 transmits a torque by using the synchronous belt, and controls horizontal rotation of the ball joint rotating member IV-40, to finely adjust the horizontal swing angle of the nozzle IV-51. Because the middle honeycomb core is of a periodic porous thin wall structure, it needs to select the most proper spray horizontal swing angle according to characteristics of a hexagon.

According to the characteristic that each inner angle of a regular hexagon is 120°, an angle with a feature is selected for analysis. Within 0°-180°, a larger angle formed by an incident angle and a reflection angle indicates better spreadability of the droplet and a better lubrication effect. Therefore, the analysis is divided into 5 stages herein:

When the incident angle is 0°-30°, the spreadability of the droplet is poor, and the lubrication effect is poor;

when the incident angle is 30°-45°, the spreadability of the droplet is relatively poor, and the lubrication effect is relatively poor;

when the incident angle is 45°, the spreadability of the droplet is general, and the lubrication effect is general;

when the incident angle is 45°-60°, the spreadability of the droplet is relatively good, and the lubricating effect is relatively good; and when the incident angle is 60°-90°, the spreadability of the droplet is good, and the lubricating effect is good.

Figure 32:
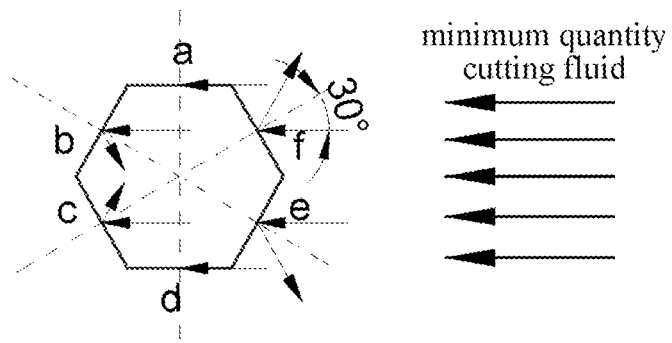
FIG. 32 is a schematic diagram of case 1 of analyzing a minimum quantity lubrication incident angle in Embodiment 1 of the present invention.

The analysis of the incident angle includes the following four cases:

Case 1: As shown in FIG. 32, when the nozzle performs spraying at a horizontal swing angle of 0°, minimum quantity cutting fluid may be horizontally sprayed and spread on thin wall surfaces a and d of a regular hexagon of a honeycomb wall, and a good lubrication effect is achieved; and on thin wall surfaces b, c, e, and f, all the minimum quantity cutting fluid is sprayed at incident angles of 30° to normal lines of the thin wall surfaces, and the droplets have relatively poor spreadability on the thin wall surfaces.

Figure 33:
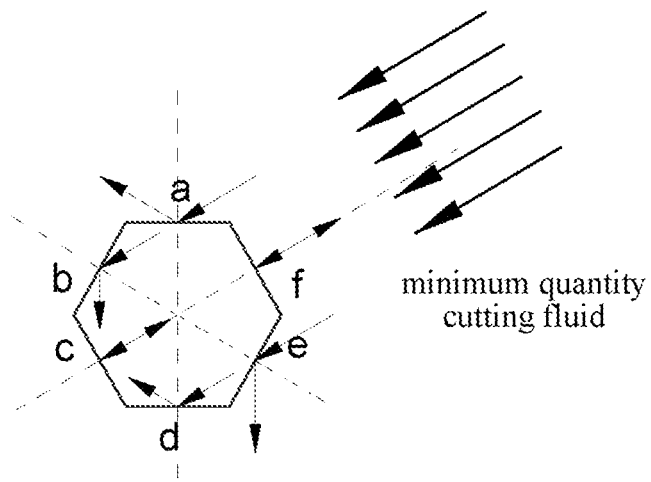
FIG. 33 is a schematic diagram of case 2 of analyzing a minimum quantity lubrication incident angle in Embodiment 1 of the present invention.

Case 2: As shown in FIG. 33, when the nozzle performs spraying at a horizontal swing angle of 30°, the minimum quantity cutting fluid is vertically sprayed on thin wall surfaces c and f of a regular hexagon of a honeycomb wall, and vertical reflection also occurs, resulting in a poor lubrication effect; and on thin wall surfaces a, b, d, and e, all the minimum quantity cutting fluid is sprayed at incident angles of 60° to normal lines of the thin wall surfaces, and the droplets have relatively good spreadability on the thin wall surfaces.

Figure 34:
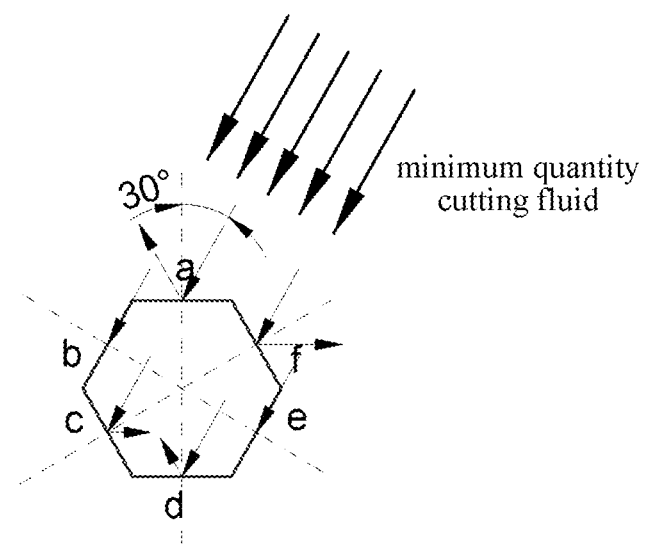
FIG. 34 is a schematic diagram of case 3 of analyzing a minimum quantity lubrication incident angle in Embodiment 1 of the present invention.

Case 3: As shown in FIG. 34, when the nozzle performs spraying at a horizontal swing angle of 60°, minimum quantity cutting fluid may be horizontally sprayed and spread on thin wall surfaces b and e of a regular hexagon of a honeycomb wall, and a good lubrication effect is achieved; and on thin wall surfaces a, c, d, and f, all the minimum quantity cutting fluid is sprayed at incident angles of 30° to normal lines of the thin wall surfaces, and the droplets have relatively poor spreadability on the thin wall surfaces. The phenomenon in case 3 and the phenomenon in case 1 are the same, but are also different when a factor of a cutting direction is considered.

Figure 35:
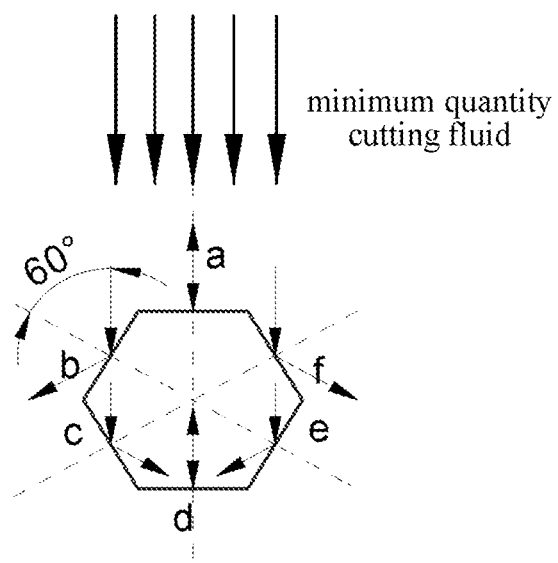
FIG. 35 is a schematic diagram of case 4 of analyzing a minimum quantity lubrication incident angle in Embodiment 1 of the present invention.

Case 4: As shown in FIG. 35, when the nozzle performs spraying at a horizontal swing angle of 90°, the minimum quantity cutting fluid is vertically sprayed on thin wall surfaces a and d of a regular hexagon of a honeycomb wall, and vertical reflection also occurs, resulting in a poor lubrication effect; and on thin wall surfaces b, c, e, and f, all the minimum quantity cutting fluid is sprayed at incident angles of 60° to normal lines of the thin wall surfaces, and the droplets have relatively good spreadability on the thin wall surfaces. The phenomenon in case 4 and the phenomenon in case 2 are the same, but are also different when a factor of a cutting direction is considered.

It can be found through the analysis of the foregoing four cases that, assuming that when the cutting direction of the milling cutter is horizontal to the right, if case 1 and case 3 are selected, two thin wall surfaces have good lubrication effects, and four thin wall surfaces have poor lubrication effects; and if case 2 and case 4 are selected, four thin wall surfaces have relatively good lubrication effects, and two thin wall surfaces have poor lubrication effects. Case 3 and case 4 are rejected due to a reason of the cutting path. Then, it can be learned through the analysis of case 1 and case 2 that the six thin wall surfaces cannot be simultaneously in a state that the droplets have relatively good spreadability regardless of angles of the nozzle. Therefore, it needs to adjust the horizontal swing angle of the nozzle as much as possible to make four of the six surfaces be in a state that the spreadability is relatively good. Therefore, in a process of adjusting the horizontal swing angle of the nozzle from 0° to 90°, it is found that the most suitable adjustment range of the horizontal swing angle is greater than or equal to 15° and less than or equal to 45°, so that the four of the six surfaces can be in the state that the droplets have relatively good spreadability.

By using the foregoing cooperation between the high elevation mechanism and the low elevation mechanism, the elevation can be adjusted, and the spray distance, that is, the target distance can be properly adjusted. A calculation for the theoretical analysis of the nozzle distance is as follows:

Boundary conditions for the droplet to attach are as follows:

A movement of an oil droplet in MQL atomization is mainly controlled by resistance of the airflow field. Therefore, under specific air flow, the nozzle distance has a great impact on a hitting speed of the oil droplet. First, two necessary dimensionless parameters are given, including the following content:

Weber number of the droplet:

$$We = \frac{\rho_d V_{In}^2 d_d}{\sigma} \tag{16}$$

where $\rho_d$ is a liquid density of the droplet; $V_{In}$ is a normal incident speed of the droplet; $d_d$ is a diameter of the droplet; and $\sigma$ is a surface tension.

Laplace number of the droplet:

The Laplace number represents a ratio of the surface tension to a viscous force acting on fluid.

$$La = \frac{\rho_d \sigma d_d}{\mu^2} \tag{17}$$

where $\mu$ a liquid viscosity of the droplet.

Figure 36:
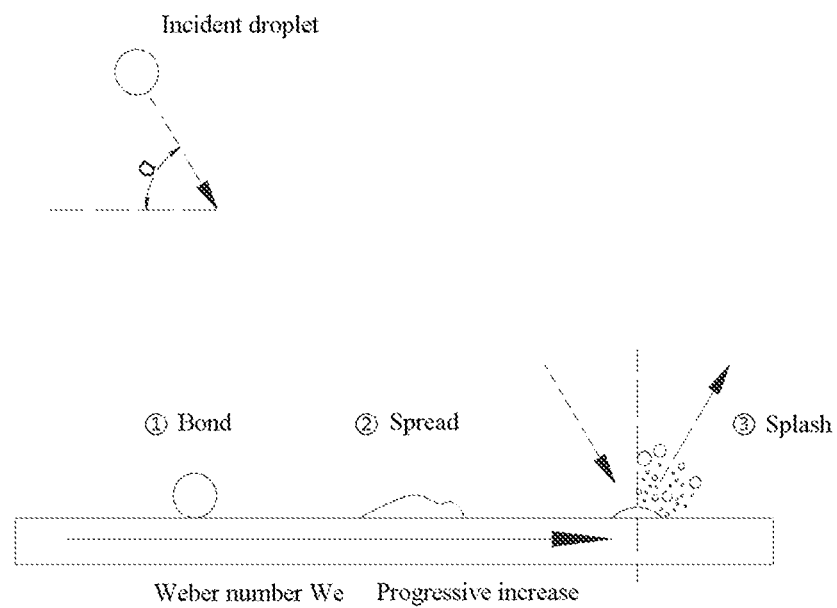
FIG. 36 is a diagram of a manner in which an incident droplet hits a workpiece surface in Embodiment 1 of the present invention.

FIG. 36 is a diagram of a manner in which an incident droplet hits a workpiece surface. As shown in the figure, as a Weber number increases, the manner in which the droplet hits is a process from bonding to spreading and then to splashing.

If two forms of "bonding" and "spreading" are both regarded as an "adhesion" form, the following formula needs to be met:

$$We < We_c = A \cdot La^{-0.18} \tag{18}$$

The droplet may be attached, and a formula (19) is derived:

$$V_{In} < V_{Inc} = \sqrt{\frac{\sigma \cdot A \cdot La^{-0.18}}{\rho_d \cdot d_d}} \tag{19}$$

where $V_{Inc}$ is a critical normal incident speed of the droplet.

Figure 37:
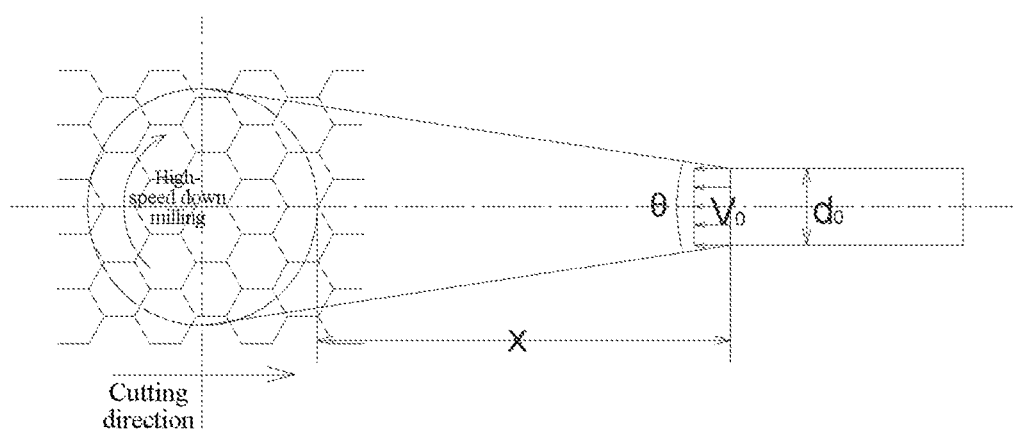
FIG. 37 is a schematic diagram of a geometric relationship of a nozzle position in Embodiment 1 of the present invention.

FIG. 37 is a schematic diagram of a geometric relationship of a nozzle position. A distribution of center line speeds of the nozzle atomization is as follows:

$$\frac{V_x}{V_0} = \frac{0.48}{\frac{x \cdot \tan(\theta/2)}{3.4 d_0} + 0.147} \quad (20)$$

where x is an axial distance from the nozzle to the cutting tool and the workpiece surface, θ is an angle range in which the nozzle may spray; $d_0$ is an outlet diameter of the nozzle; $V_x$ is a droplet speed at the position x; and $V_0$ is an outlet speed of the nozzle.

A formula for solving the outlet speed of the nozzle is:

$$V_0 = \frac{4Q}{\pi d_0^2} \quad (21)$$

where $Q$ is air flow.

Considering that an effect of the elevation α is to spray a small droplet to a cutting region as much as possible, there is:

$$V_x = V_{tn}/\cos \alpha \quad (22)$$

It can be learned from the formulas (19), (20), (21), and (22), a critical nozzle distance for the droplet to adhere is:

$$x_c = \frac{3.4 \cdot d_0}{\tan(\theta/2)} \cdot \left( \frac{1.92 \cdot Q \cdot \cos\alpha}{\pi \cdot d_0^2} \cdot \sqrt{\frac{\rho_d \cdot d_d}{\sigma \cdot A \cdot L\alpha^{-0.18}}} - 0.147 \right) \quad (23)$$

The positioning system in the present invention can provide a reliable clamping force, and can adjust a pressing force, so that clamping and unloading are convenient and quick. The linkage working method for the machine tool cutting path of the fixture is suitable for machining a large-size honeycomb workpiece. That is, the fixture may perform clamping near a machining region at which the cutting tool is machined, thereby ensuring the reliability of machining to the greatest extent. In addition, it is environmentally friendly because the mechanical structure is used. The equipment further includes the minimum quantity lubrication spray angle control apparatus, which can follow a movement of the machine tool spindle during machining and automatically adjust the angle at any time, and the theoretical analysis of the horizontal swing angle of the nozzle and the target distance is further made for the characteristic of the hexagonal structure of the honeycomb core, so that the angle at which the nozzle performs spraying is more adaptable to changes during machining, and the minimum quantity lubrication can better assist in cutting machining. By using the positioning system and the milling equipment in the present invention, the equipment compartment bottom plate in the rail transit core components can be mass-produced. When the equipment compartment bottom plate is machined, no form and position errors generate, and when the honeycomb plate is milled, the jet flow parameters are adjusted and controlled, to avoid defects of the honeycomb plate and ensure the cushioning performance when the honeycomb plate is applied to rail vehicles. The present invention can serve subways and high-speed railways, and resolve technical problems in the industry field, but is not limited thereto.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A positioning system with an adjustable clamping force for clamping a rail transit honeycomb workpiece, comprising:
a positioning apparatus, comprising a positioning table to support the workpiece; and
a plurality of clamping apparatuses, each clamping apparatus of the plurality of clamping apparatuses comprising a respective turntable, wherein each of the turntables is fixedly disposed on a periphery of the positioning table, a respective top of each of the turntables is connected to a respective mechanical arm, a respective pressure plate is disposed at an end of each of the mechanical arms, and each of the pressure plates is capable of cooperating with the positioning table to clamp the workpiece, wherein
each of the clamping apparatuses comprises a respective working region having a respective boundary defined by a maximum working range of movement of the corresponding mechanical arm, and wherein the working regions of adjacent ones of the clamping apparatuses have an intersection, the working regions each include a respective non-intersecting region which does not intersect with any other of the working regions, and the working regions of all the clamping apparatuses are capable of covering a machining surface of the workpiece; and when machining is performed on the workpiece in one of the intersections, one of the clamping apparatuses that corresponds to the intersection clamps the workpiece, and when machining is performed on the workpiece in one of the non-intersection regions, one of the clamping apparatuses corresponding to the one of the non-intersecting regions moves away from the workpiece, and an adjacent one of the clamping apparatuses adjacent to the one of the non-intersecting regions clamps the workpiece.

2. The positioning system with an adjustable clamping force according to claim 1, wherein each of the mechanical arms comprises a respective main arm connected to the corresponding turntable, wherein each of the main arms is hinged with a respective side portion of a respective middle arm, wherein each of the middle arms is connected to the corresponding pressure plate by a respective end joint, wherein each of the main arms and each of the middle arms are capable of swinging up and down, and wherein each of the end joints is capable of driving the corresponding pressure plate to rotate in a direction of a corresponding plate surface of the corresponding pressing plate, so that the corresponding pressure plate is always parallel to a workpiece surface.

3. The positioning system with an adjustable clamping force according to claim 2, wherein each of the middle arms comprises a respective end portion that is further hinged with a respective connecting rod, wherein each of the connecting rods is hinged with a respective rocker that swings up and down, wherein each of the rockers is connected to a respective one of the main arms, and wherein the swinging of the rockers is independent from the swinging of the main arms.

4. The positioning system with an adjustable clamping force according to claim 3, wherein each of the connecting rods is disposed in parallel to a respective one of the main arms, and wherein a respective connection point between each of the connecting rods and the corresponding middle arm, a respective connection point between each of the connecting rods and the corresponding rocker, a respective connection point between each of the main arms and the corresponding middle arm, and a respective connection point between each of the main arms and the corresponding rocker are connected to form a respective parallelogram.

5. The positioning system with an adjustable clamping force according to claim 2, wherein each of the turntables comprises a respective main rotating body that is rotatable horizontally, and each of the main rotating bodies is connected to a respective one of the main arms.

6. The positioning system with an adjustable clamping force according to claim 5, wherein each of the main rotating bodies and the corresponding pressure plate rotate synchronously, and have a same rotation angle and opposite rotation directions.

7. The positioning system with an adjustable clamping force according to claim 1, wherein a respective pressure sensor is inserted into each of the pressure plates, and a respective end surface of each of the pressure sensors is flush with a respective end surface of the corresponding pressure plate.

8. The positioning system with an adjustable clamping force according to claim 1, wherein the positioning apparatus comprises a plurality of positioning adjustment apparatuses that are fixedly disposed on a peripheral side of the positioning table, to implement six-point positioning of the workpiece; and each of the positioning adjustment apparatuses comprises a respective positioning element and a respective up-and-down reciprocating apparatus, wherein a respective bottom of each of the positioning elements is connected to a respective one of the up-and-down reciprocating apparatuses in order to enable an adjustment of a height of the corresponding positioning element.

9. The positioning system with an adjustable clamping force according to claim 8, wherein each of the positioning elements is higher than the positioning table to position a side portion of the workpiece.

10. A milling equipment, comprising the positioning system with an adjustable clamping force according to claim 1, wherein the milling equipment is configured for milling the rail transit honeycomb workpiece.

11. The milling equipment according to claim 10, further comprising a milling machine, wherein the milling machine is connected to a minimum quantity lubrication spray angle control apparatus by a machine tool spindle, the minimum quantity lubrication spray angle control apparatus is connected to a nozzle, and the minimum quantity lubrication spray angle control apparatus is disposed above the positioning table.

12. The milling equipment according to claim 11, wherein the minimum quantity lubrication spray angle control apparatus comprises a higher elevation rod, the higher elevation rod is connected to a lower elevation mechanism, the lower elevation mechanism, located at a lower elevation than is the higher elevation rod, is connected to the nozzle to adjust an elevation of the nozzle, and the nozzle is connected to an atomizer by a universal joint cooling pipe.

13. The milling equipment according to claim 12, wherein the higher elevation rod is hinged with a spindle connecting member to adjust the elevation of the nozzle, the spindle connecting member is connected to the machine tool spindle, and the nozzle extends to a milling cutter at a bottom of the machine tool spindle.

14. The milling equipment according to claim 13, wherein the spindle connecting member is of an arc-shaped plate-type structure, and the arc-shaped plate-type structure is engaged with an outside of the machine tool spindle.

15. The milling equipment according to claim 12, wherein the lower elevation mechanism comprises a lower elevation rotating member that is rotatable in a vertical direction, the lower elevation rotating member has a groove to accommodate and fix a horizontal swing angle mechanism, the horizontal swing angle mechanism comprises a ball joint rotating member, the ball joint rotating member is connected to the nozzle, and the ball joint rotating member is rotatable in a horizontal direction to drive the nozzle to adjust a horizontal swing angle.

16. The milling equipment according to claim 11, wherein the nozzle can swing over a horizontal swing angle range of thirty degrees.

* * * * *